US012373437B1

United States Patent
Singh et al.

(10) Patent No.: US 12,373,437 B1
(45) Date of Patent: *Jul. 29, 2025

(54) METHOD AND SYSTEM FOR TRANSPARENT DATABASE QUERY CACHING

(71) Applicant: Ignite ScalArc Solutions, Inc., Austin, TX (US)

(72) Inventors: Varun Singh, Santa Clara, CA (US); Uday V. Sawant, Mumbai (IN); Prateek Goel, Roorkee (IN); Naresh G. Deshavini, Mumbai (IN)

(73) Assignee: Ignite ScalArc Solutions, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,058

(22) Filed: Oct. 31, 2023

Related U.S. Application Data

(63) Continuation of application No. 17/343,685, filed on Jun. 9, 2021, now Pat. No. 11,836,135, which is a continuation of application No. 16/535,377, filed on Aug. 8, 2019, now Pat. No. 11,061,917, which is a continuation of application No. 14/014,135, filed on Aug. 29, 2013, now Pat. No. 10,417,243, which is a continuation of application No. 12/853,649, filed on Aug. 10, 2010, now Pat. No. 8,543,554.

(51) Int. Cl.
*G06F 16/24* (2019.01)
*G06F 16/2455* (2019.01)
*G06F 16/2458* (2019.01)

(52) U.S. Cl.
CPC .... *G06F 16/24552* (2019.01); *G06F 16/2471* (2019.01)

(58) Field of Classification Search
CPC .................................................. G06F 16/24552
USPC .......................................................... 707/747
See application file for complete search history.

(56) References Cited

U.S. PATENT DOCUMENTS

| | | | | |
|---|---|---|---|---|
| 2007/0239716 | A1* | 10/2007 | Weininger | .......... G06F 16/9535 |
| 2010/0095018 | A1* | 4/2010 | Khemani | ................ H04L 41/50 |
| | | | | 719/315 |
| 2011/0072007 | A1* | 3/2011 | Le Pennec | ........ G06F 16/24539 |
| | | | | 707/718 |

OTHER PUBLICATIONS

Notice of Allowance mailed on Jul. 31, 2023, filed in U.S. Appl. No. 17/343,685, pp. 1-2.

(Continued)

*Primary Examiner* — Syling Yen

(57) ABSTRACT

Roughly described, a database accelerator is installed in a network having client systems which makes database queries to a particular IP address and port, and database servers which accept queries received at an IP address and port. The accelerator includes a cache, and is arranged to receive, through a network port, a database query made by a client system and directed to the particular IP address and port, return response data from the cache if available there, and if not, then forward the query through a network port to the database servers. Upon receipt of response data from the servers, the accelerator can retain it in its cache in addition to forwarding it back to the client. By installing the accelerator transparently in the network, no changes are required to either the client or server software in order to add query caching functionality to an existing client/server database arrangement.

7 Claims, 23 Drawing Sheets

(56) References Cited

OTHER PUBLICATIONS

Response to Final Office Action dated Jul. 17, 2023, filed in U.S. Appl. No. 17/343,685, pp. 1-9.
Terminal Disclaimer approved Jul. 17, 2023, filed in U.S. Appl. No. 17/343,685, p. 1.
Terminal Disclaimer filed Jul. 17, 2023, filed in U.S. Appl. No. 17/343,685, pp. 1-3.
Final Office Action mailed Jun. 2, 2023, filed in U.S. Appl. No. 17/343,685, pp. 1-5.
Response to Non-Final Office Action dated May 17, 2023, filed in U.S. Appl. No. 17/343,685, pp. 1-10.
Non-Final Office Action mailed Feb. 17, 2023, filed in U.S. Appl. No. 17/343,685, pp. 1-31.
Response to Election/Restriction Requirement dated Feb. 8, 2023, filed in U.S. Appl. No. 17/343,685, p. 1.
Requirement for Election/Restriction mailed Aug. 8, 2022, filed in U.S. Appl. No. 17/343,685, pp. 1-6.

\* cited by examiner

PROCESS FOR BACKING UP CACHED DATA
TO PERSISTENT STORAGE

METHOD AND SYSTEM FOR TRANSPARENT DATABASE QUERY CACHING

FIELD OF INVENTION

The invention relates generally to accelerating database systems in a typical two or three tier database driven application environment, and in particular, to a mechanism for defining and handling database query caching transparently.

BACKGROUND

In a basic database client/server arrangement, one or more database clients can make queries via a network to a back-end database server. The database server executes the queries and returns results to the client that requested them. The clients might be, for example, web servers or application servers or a mix of both. Typically all the clients transmit their queries to a common IP address and port number combination on the database server, and the database server transmits its results back to the IP address that originated each query. Usually an authentication process precedes the queries, in which the client provides the database server with authentication credentials (such as a username and password) and the database server establishes a "connection", identified by a connection ID, according to which the client can make its queries. A database server in this basic arrangement is often a single computer system, though in some implementations it might actually be a cluster of computer systems. Even such a cluster, however, is arranged so as to appear to the client as a single server reached via a single IP address and port number combination.

Many more sophisticated database client/server arrangements support the concept of master-slave replication to distribute or spread the load of read/write queries among a plurality of servers. Database servers configured for master-slave replication are said to form a cluster, and operate in sync with each other ensuring that the data between all servers in a cluster is current. One of the advantages that master-slave replication offers is that of allowing the application administrators to scale out read performance, without spending excessively on hardware by having to buy a single, more powerful server. The master database server handles all queries that write/manipulate data (insert/update) and the remaining read queries (select) are distributed among the master and the slaves.

Any query or command which does not alter the database in any way, and merely retrieves information stored in the database, is considered a read query, and is typically capable of being processed by both the slave and the master servers, examples of such queries are basic "select" queries, which just retrieve a particular value from a table in the database. Any query or command which may alter or change or delete or add data in the database, or other related metadata like usernames, passwords, configuration etc. is considered a write query, and can only be handled by master servers, examples of such queries are basic "insert", or "alter" queries which add or modify the data or structure of a table in a database. If a write query were to be sent to a slave server, it will either be ignored, or cause the slave database to have a different state of data than the master, and hence fall out of sync, compromising the data integrity of the cluster.

In a typical Master-Slave database architecture, there are designated master and slave database servers. The master servers are capable of handling both read and write queries, while the slave servers handle the read queries. The most commonly used replication method used in a typical master-slave cluster involves the slave database servers reading the logs of transactions on the master servers that store all SQL statements that manipulated the database and execute them locally to ensure that the master and the slave database servers are in sync. Some replication architectures may also utilize a separate replication manager component which monitors the master servers for changes, and once a change is found, pushes the change to the slave servers, leaving both the master and the slave servers free from the complexity of maintaining sync.

In certain master-slave architectures, the data is stored in a central location (like a SAN), and read from that central location with the aid of a cluster file system. This eliminates the need to perform log based replication, but comes with the additional complexity involved in maintaining a single data store.

An interface between the database servers and user applications, often referred to as database middleware, have been in use for some time to overcome the limits of conventional client/server database systems. One such limit often encountered in a conventional database system is that of the overhead involved in executing a simple read only query. For every query performed by the application, the database server has to process the structured database query, compile it into a form that can be understood by the database storage engine, physically fetch a large block of data from the disk systems where it resides for the sake of consistency and persistence, filter the large block of data, and make sure that only the part that is specified in the query is sent back to the application. This process is complicated, and highly repetitive, and becomes a considerable overhead for applications that access the database system intensively.

To overcome this overhead, some more sophisticated database systems implement a query caching system, either within the client application or within the database servers or both. But to implement query caching in a more basic database system, modifications would be required either in the application or server, or software additions would be required to either the client system, or the database server, or both, to be able to identify the data being requested, and then cache the same. Closed source applications that do not support code editing not even capable of being modified to implement query caching. In addition, even sophisticated database systems which do implement query caching often do so in a sub-optimal manner.

For example, conventional database systems which do implement query caching lack a configuration management tool or transparent layer that, without modifying low level application code or server configuration, permits the application developer or database administrator to specify rules or metadata of queries that are to be cached.

Nor do conventional database systems include a mechanism for clearing or deleting specific cache entries, or groups of cache entries, from the query caching system on demand, unless specifically written for the application, manually by the developers.

Nor do all conventional query caching systems support persistency of cached data. On instances when the cache crashes or the system restarts, since the entire cache system in maintained in volatile memory (RAM) to ensure good performance, when such a system recovers from a crash or a restart, the data cache is cleared. This results in what is called the cold start problem. On clearing the caching system, no data resides in it, so all database queries are served by the database system, which incurs considerable compute time cost. In case of read intensive applications, this becomes a bottleneck which many times results in further database system crashes.

Applicants have identified a need for a query caching system that acts as database middleware and addresses the drawbacks of existing query caching systems. Such a system will considerably reduce the overhead involved in executing queries on database servers thereby reducing the possibility of database servers from becoming bottlenecks in user applications.

SUMMARY

A query caching system according to the invention will be described with reference to accompanying figures. The following points are highlighted:

The query caching functionality can be embodied in a transparent facility between traditional database server clusters and applications wanting to access them. Such a facility can be thought of as database middleware. In an embodiment, the facility can take the form of a query caching device disposed between the database clients, on one side, and the database server cluster, on the other side.

Database query requests from user applications are routed through the query caching system to the database servers transparently. No additional software or application code changes, beyond basic network level configuration, is required to introduce features of the query caching system into the application architecture.

The query caching system can include a configuration management interface that database administrators can use to configure the query caching system. These configuration options can help to ensure that the query caching system is transparent in nature. The database administrator can monitor the caching system and manipulate it at any level of granularity, without having to modify or augment the application code, or the database server in any way.

For example, embodiments of the invention can provide options to database administrators to decide the nature of the data which is to be cached. These options, sometimes called cacheability rules, can specify: specific patterns of queries, tables specific to a user, and/or database names. The database administrators can also specify the Time To Live (TTL) for each of these pattern options.

As another example, embodiments of the invention can provide options to database administrators to delete data stored in the cache on demand (even overriding the TTL) and also at any level of granularity: keys, tables, patterns, or on the whole for a database, or a complete application cluster.

In an embodiment, when a user application submits a database query, it is received first by the query caching system which checks whether a cacheability rule has been specified that matches the incoming query. If such a rule does exist, then a lookup is performed in the cache for that particular query. If a matching query exists, then the response data previously cached for that query is returned to the client application. In such a case, the database query is served immediately and need not be addressed by the database server, thereby considerably reducing query response time.

If a cacheability rule exists which matches the incoming database query, but the query does not exist in the cache, then the query caching system passes it onto the database server. The database server executes the query in the usual manner, and transmits its return data to the query caching system. The query caching system forwards the return data back to the originating client, but also caches it, in association with a query key, TTL and metadata set, so that it is available in cache for future repetitions of the same query.

In some embodiments, the query cache stores queries in key-value pairs, where the key uniquely identifies the query, and the value is a pointer to the return data in memory. To ensure that the query caching system can serve a varied set of databases and tables, across multiple user credentials without data cache overlap, the key can be mapped to not only the query, but also to a wide metadata set which includes the database name, table name, the credentials of the user requesting the query, and/or the time of storage of that particular cache entry. The key can be constructed as a hash of all these components.

The query cache itself preferably resides in memory (RAM). Hence, when a key exists in the cache, the response data can be instantly served back to the application without the need to perform a disk access.

To overcome the cold start problem described above, a query caching system according to the invention can ensure that the cached data is persistent in nature. Data persistency can be ensured by regularly writing a back-up of the cached data onto persistent storage, such as a hard disk drive or a Solid State Drive (SSD). Preferably, the back-ups use a delayed write mechanism that does not impact in-memory performance. Whenever the query caching system is restarted, a bootstrap routine reads the data in persistent storage and re-writes it into the in-memory (RAM) cache. Data is then already present in cache when the first submitted query is received, thereby helping to overcome the cold start problem which could otherwise crash database servers repeatedly. Preferably, the persistent cache backup is used only for restoring the in-memory cache after restart, and not for serving data in response to live queries. Accordingly, the presence of a persistent cache backup does not affect the response time incurred by the query caching system in serving data.

The client application need not be aware of the existence of the query caching system. Nor does installation of the system require any change in the implementation of the application or the database server, other than basic network configuration changes.

Embodiments of the invention can also include a mode of operation in which the query caching functionality is disabled. Such an embodiment still can be useful where the system housing it performs other services, such as query-type-based query routing.

Embodiments of the invention can be embodied in a network element which is physically separate from both the client and server systems, or can be embodied in a separate virtual machine housed in the same enclosure as one of the client systems, server systems, or both.

The above summary is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
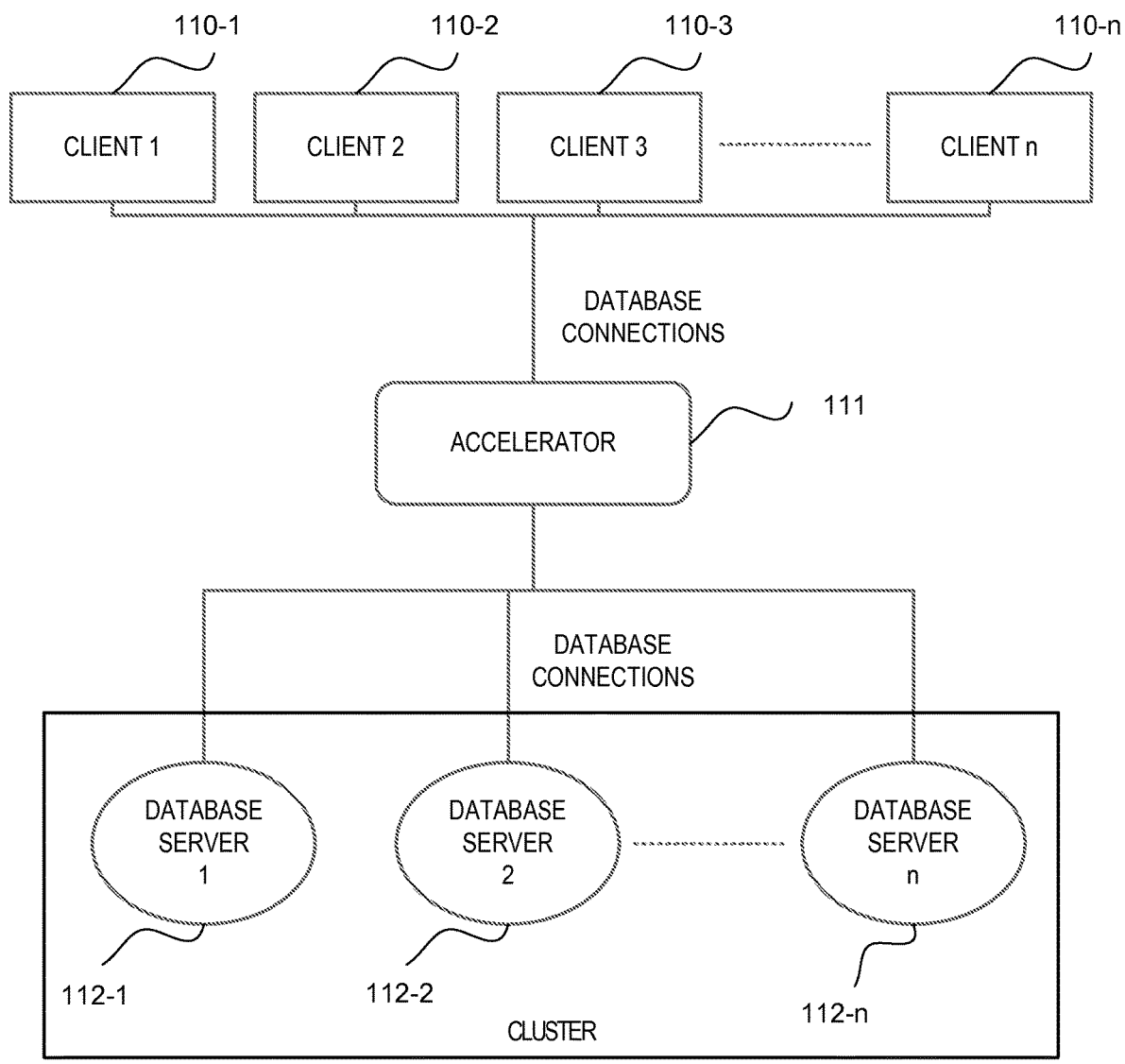
FIG. 1 illustrates the network architecture of a typical two-tier database driven arrangement, modified to incorporate features of the invention.

FIG. 1 illustrates the network architecture of a typical two-tier database driven arrangement, with a database accelerator according to the invention transparently inserted into the architecture. The architecture includes clients 110-1, 110-2, 110-3, . . . , 110-n (illustratively 110), the database accelerator 111, and database servers 112-1, 112-2, . . . , 112-n (illustratively 112). The clients 110 in this embodiment are executing a simple database-driven application which is not cluster-ware. That is, the application directs all queries, whether read or write, to a single IP address and port combination at which it expects the single database server is present. Transparently to the client applications, however, the single IP address and port combination belongs to the database accelerator 111 rather than to a database server. Thus all database queries from the clients 110 are received at the database accelerator via a network port on the database accelerator 111.

Database accelerator 111 implements one or more of the following features: authentication offload, query caching, connection pooling to the servers, and query routing. Each of these features is advantageous by itself, but since many of the features benefit from each other, each added one increases the value of the accelerator by more than just the value of the added feature. For query routing, the database accelerator 111 determines whether each incoming query is a read query or a write query, and in dependence upon that determination forwards it to an appropriate one of the database servers 112. Typically the database servers 112 include a first set that are optimized to handle read queries and a second set that are optimized to handle write queries, and the database accelerator 111 routes all incoming write queries to one of the servers in the second set, and routes at least one of the incoming read queries to one of the servers in the first set. As further described herein, some read queries can also be routed to servers in the second set if, for example, all connections to all the servers in the first set are busy. Typically the servers 112 may be organized in a master/slave configuration, with all the slave servers being allocated in the database accelerator 111 to the first set (the read-only servers) and all the master servers being allocated in the database accelerator 111 to the second set (the read/write servers). The servers 112 are sometimes referred to herein as a cluster.

For query caching, the database accelerator 111 determines whether each incoming query has a response already stored within a cache memory in the database accelerator 111. If so, then the database accelerator 111 response to the client system with the cached response. If the data is not already stored in me accelerator cash, then the accelerator 111 forwards the query to an appropriate database server 112. When the response comes back, the database accelerator 111 forwards it back to the client system. If appropriate, the database accelerator 111 they also cache the response data.

For the authentication offload feature, the database accelerator 111 receives a connection request from a client system. If the accelerator 111 has stored authentication credentials for the identified user, then the accelerator 111 emulates a database server and carries out the authentication process with the client system. The accelerator 111 also emulates a client system and carries out the authentication process with a database server, but only if and when needed. A server-side authentication process can be avoided if, for example, a server-side connection of an appropriate type is already available in a pool, or if the client's query can be satisfied from the accelerator's cache.

For the connection pooling feature, the accelerator 111 maintains or more pools of server-side authenticated connections to the database servers 112. When a query transaction completes, instead of tearing down the connection, the accelerator 111 maintains it in the pool and marks it as inactive. A future database query arriving from any of the clients 110 with the same user login can then be forwarded on one of the pooled server-side connections to an appropriate database server without having to re-establish a new authenticated server-side connection. Server side connections are created when needed, up to a user-configurable maximum per server. If the accelerator 111 has a query to forward to a database server 112, and no connections are currently available, and the maximum number of connections has already been reached, then the accelerator 111 will hold the query in a queue until an appropriate server-side connection becomes available.

In most embodiments described herein, the terms "client", "client application" and "application" are used interchangeably. However, it will be appreciated that a "client system" can run multiple "client applications" within a single instance of an operating system. It is the client applications which make database queries and receive the results, but because of such applications, the client system as a whole can also be said to make database queries and receive the results. For simplicity of discussion, the terms will continue to be used interchangeably herein as if each client 110 is running only a single client application. Note that the client applications can include, among other things, web servers. These should not be confused with the database servers, since in the client/server database arrangement, these web server applications are acting as clients of the database servers.

Whereas the database accelerator 111 is illustrated in FIG. 1 as a separate physical appliance on a physical network along with other physical clients and servers, it will be appreciated that in other embodiments the database accelerator 111 can be embodied in a virtual machine. As such it can be housed in the same enclosure and supported by the same hypervisor as one or more of the clients 110 and/or servers 112, which also can be embodied in virtual machines. All these virtual machines can be distributed among one or any number of physical machines in any combination.

Figure 4:
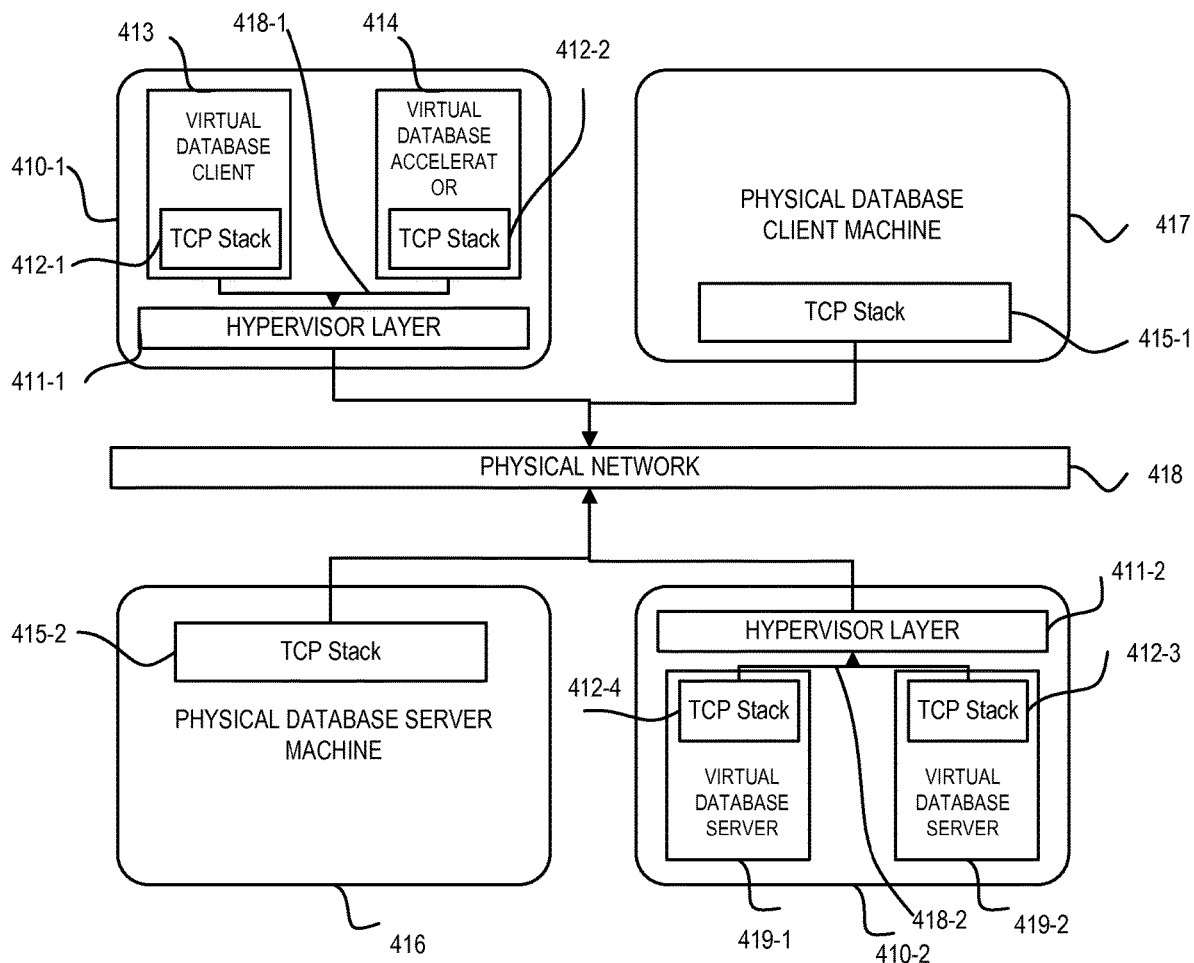
FIG. 4 illustrates an arrangement incorporating features of the invention, in which a database accelerator is embodied in a virtual machine.

FIG. 4 illustrates one arrangement in which a database accelerator 414 is embodied in a virtual machine, and housed in the same enclosure 410-1 as another virtual machine running one of the database clients 413. The two virtual machines also share a hypervisor layer 411-1 in the enclosure 410-1. The arrangement of FIG. 4 also shows, for illustration purposes, a second physical client 417, a physical database server 416, as well as yet another enclosure 410-2 housing two further database servers embodied in respective virtual machines 419-1 and 419-2. The two virtual machines 419-1 and 419-2 share another hypervisor layer 411-2. All of the physical machines are in communication with each other via a physical network 418. Network 418 can be any manner of physical network, including for example wired or wireless Ethernet, cable, fiber, WiFi, WiMax, Cellular, ATM, LAN, WAN, or combinations of these or others. Each of the machines 410-1 and 410-2 also includes a respective virtual network 418-1 and 418-2, via which the virtual machines inside communicate with each other and with the physical network 418. All of the physical and virtual networks via which the various clients, servers and database accelerator communicate, including routers and bridges and radios and other intervening network components not shown in FIG. 4, together are said to constitute a "network".

Each of the components (clients, servers and database accelerator 414) communicate with the network via a "network port". As used herein, a "network port" can be physical or virtual, but it includes an address or point of presence at which it can be reached by other components on the network. Because the network is based on IP, each network port has a respective IP address and port number combination at which it can be reached by other components on the network. Through network address translation (NAT) and other technologies it may be that the IP address and port number to which a sending component sends a message may not be the same IP address and port number at which the ultimate destination component receives the message. However, as used herein, two IP address and port number combinations are considered to be "the same" if the network routing is set so that if the sender sends to the first IP address and port number combination, it will be properly routed to the second IP address and port number.

In addition, because the network in FIG. 4 is TCP/IP-based, each component (clients, servers and database accelerator 414) communicates through its port via a respective TCP stack.

Also as previously mentioned, embodiments of the invention can allow for transparent insertion of query routing functionality (directing queries to different servers depending on whether they are determined to be "read" or "write" queries) in a client/server database architecture where different servers host different partitions of a database. In such an architecture, each client application internally determines which partition server should receive each query, and transmits the query to the IP address/port combination for that server. A query router facility inserted into this architecture may contain n query router instances, one for each partition server as seen by the client applications. (Alternatively, n query routers in separate appliances or virtual machines can be inserted, or some query routers can be disposed in separate appliances while others are combined as instances in a single appliance.) Each query router instance has a respective different IP address/port combination at which it receives queries, corresponding to the IP address/port combination at which the clients expect to reach a respective one of the partition servers. Instead of a single server for each partition (or a single collection of servers reachable at a common network port for each partition), the database accelerator appliance supports a cluster for each partition. As in the embodiment of FIG. 1, each cluster includes one or more servers designated to handle only read queries for the respective partition, and one or more servers designated to handle read and write queries for the same partition.

Figure 5:
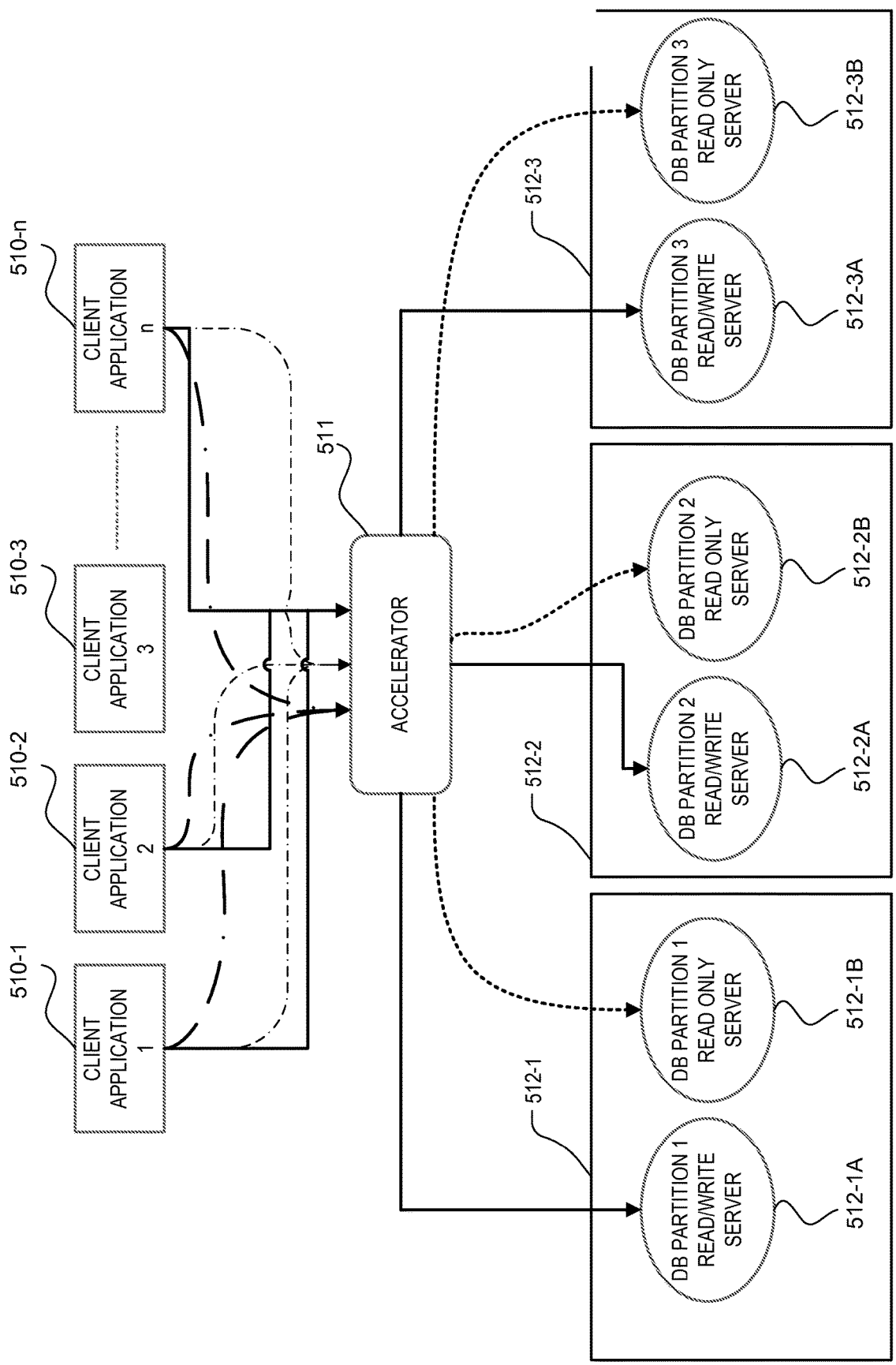
FIG. 5 illustrates an arrangement incorporating features of the invention, in which a database accelerator supports a partitioned database server architecture.

FIG. 5 illustrates such an architecture. It comprises n client applications 510-1, 510-2, . . . (representatively 510) and three server clusters 512-1, 512-2 and 512-3 (representatively 512). Server cluster 512-1 manages partition 1 of the database, whereas server cluster 512-2 manages partition 2. Server cluster 512-3 manages partition 3 of the database. Each of the clusters 512 contains at least one read/write server and at least one read-only server. For example, cluster 512-1 includes read/write server 512-1A and read-only server 512-1B. Server cluster 512-2 includes read/write server 512-2A and read-only server 512-2B. Similarly, server cluster 512-3 includes read/write server 512-3A and read-only server 512-3B.

Often client applications 510 are aware of the partitioning of the database, and therefore send their queries to the IP address and port combination for the particular cluster managing the desired partition. Since there are three partitions in the arrangement of FIG. 5, accelerator 511 has three IP address and port number combinations at which it receives the queries from the client applications 510. Thus as the client applications 510 are not modified in any way, other than network configuration, they continue to send queries for database partition 1 to the first IP address and port number combination, queries for the database partition 2 to the second IP address and port number combination, and queries for database protection 3 to the third IP address and port number combination. These three network ports, however, are now assigned to accelerator 511. Accelerator 511 therefore knows that queries received on the first, second and third ones of these ports are to be directed, respectively, to server clusters 512-1, 512-2 and 512-3. Again, no change is required to the software of the client applications or the database servers. Accelerator 511 continues to perform query routing as well, by directing write queries received on the first network port to read/write server 512-1A; read queries received on the first network port to read-only server 512-1B; write queries received on the second network port to read/write server 512-2A; read queries received on the second network port to read-only server 512-2B; write queries received on the third network port to read/write server 512-3A; and read queries received on the third network port to read-only server 512-3B.

FIG. 2 (consisting of the flow charts of FIGS. 2A, 2B, 2C and 2D) illustrates a process flow which the accelerator 111 undertakes beginning from the receipt of a connection request from a client application 110. The flow described herein will route a query to either a read-only server or to a read-write server, transparently to the client application. Transparent caching is also illustrated, though not every embodiment is required to support caching. The flow illustrated in FIG. 2 also illustrates the authentication offload feature as well as the connection pool feature, though again, not every embodiment is required to support these.

As with all flowcharts herein, it will be appreciated that many of the steps can be combined, performed in parallel or performed in a different sequence without affecting the functions achieved. In some cases a re-arrangement of steps will achieve the same results only if certain other changes are made as well, and in other cases a re-arrangement of steps will achieve the same results only if certain conditions are satisfied.

In a configuration step not shown in FIG. 2, prior to arrival of a query, a database administrator has already entered the list of servers that the database accelerator can access, and has designated each of them as a read server or a read/write server. The database administrator also enters a connection limit (number of connections) for each of the servers.

In step 201, the database accelerator 111 receives and accepts a database connection from one of the client applications 110. A database connection is a facility that allows client applications to communicate with a database server. In order to connect to a database, client applications first transmits a message to an IP address/port combination at which it expects to reach a listener process of the database server. In the arrangement of FIG. 1, the IP address/port combination belongs to the database accelerator 111 rather than to a database server, and the listener process resides on the database accelerator 111. The message from the client 110 includes a connection string which includes the username for the database, and in some environments also a password. The database accelerator 111 establishes the connection with the client 110 once details that were provided in the connection request from the client are validated against the details stored (configured by an administrator) in the database accelerator. Several back-and-forth transmissions may be involved in this authentication process.

After the database connection from the client application has been established, in step 202, the client application issues a query on the authenticated connection and the database accelerator 111 accepts it. The query arrives at the database accelerator 111 containing an SQL statement. Database queries sometimes are or contain commands rather than merely requests for information; as used herein, database commands are also considered to constitute "queries".

In step 203, the database accelerator 111 treats the SQL statement as a text string and parses it. The database accelerator 111 determines whether the SQL statement is a read query or a write query. SQL statements can be divided into two types: queries that read data (or metadata) from the database and do not alter the database, and queries that can alter the database. For example, typically a SELECT type query is a read query because it cannot alter the database. An INSERT query or an UPDATE query is treated as a write query because it can alter the database. It will be appreciated that not all queries that can alter the database actually will alter the database, since that might depend on such things as the result of a WHERE clause in the statement. Nevertheless, as used herein, a query is considered to be a "write query" so long as it is of a type that can alter the database.

In an embodiment, step 203 determines whether an incoming query is a read or a write query by comparing the query to a very simple "regular expression" ("regex"). Regular expressions are a well-known computer science tool, and are described, for example at Goyvaerts, "Regular Expressions: The Complete Tutorial" (2007), incorporated by reference herein, and available at http://www.regular-expressions.info/print.html (visited 2010 Jun. 15). For example, in one embodiment a regular expression is used which merely determines whether the word "select" appears prior to the word "from" within the text of the query. If it does, and the query is treated as a read query; if it does not, then the query is treated as a write query.

If step 203 determines that the query is a read query, then in step 204, the database accelerator 111 next determines whether the results of the indicated query are already in its own cache. The cache stores data as key-value pairs, where the read query is the key and the data that had previously been returned from a server 112 in response to that query, is included in the value. If the requested data is already in the cache, then in step 205, the data is retrieved from cache and returned to the application that submitted the query. This concludes the transaction (step 219).

If step 204 determines that the results of the query are not already in the cache, then in step 206C the database accelerator either selects an existing server-side connection or creates a new one, through which it will forward the read query. As will be seen, this will be a server-side connection either to a read-only server or to a read/write server.

If step 203 determines that the query is a write query, then in step 206B database accelerator 111 either selects an existing server-side connection to one of the read/write database servers or creates a new one, through which it will forward the write query.

Figure 2A:
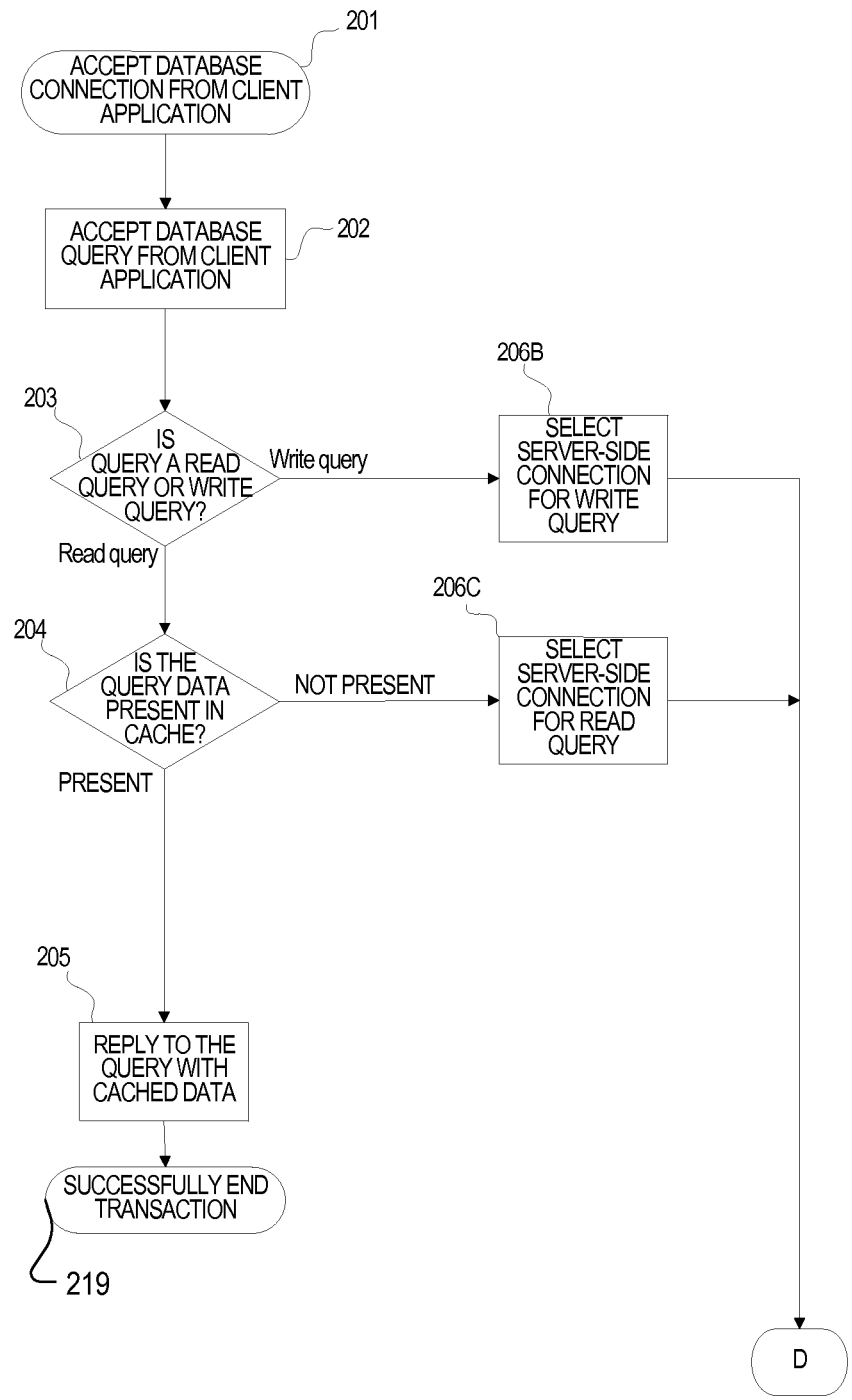
FIG. 2 (consisting of the flow charts of FIGS. 2A, 2B, 2C and 2D) illustrates a process flow which an accelerator according to the invention can undertake.
Figure 2B:
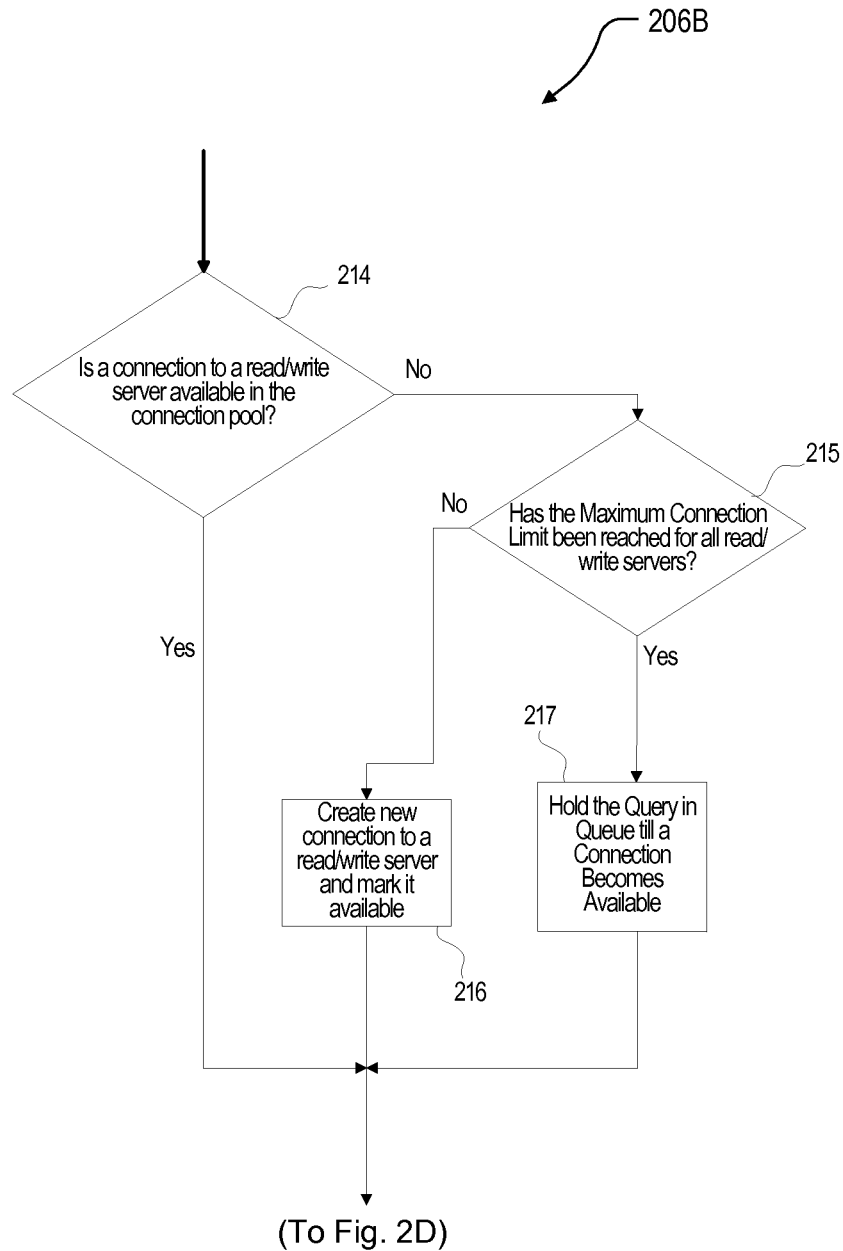
Figure 2C:
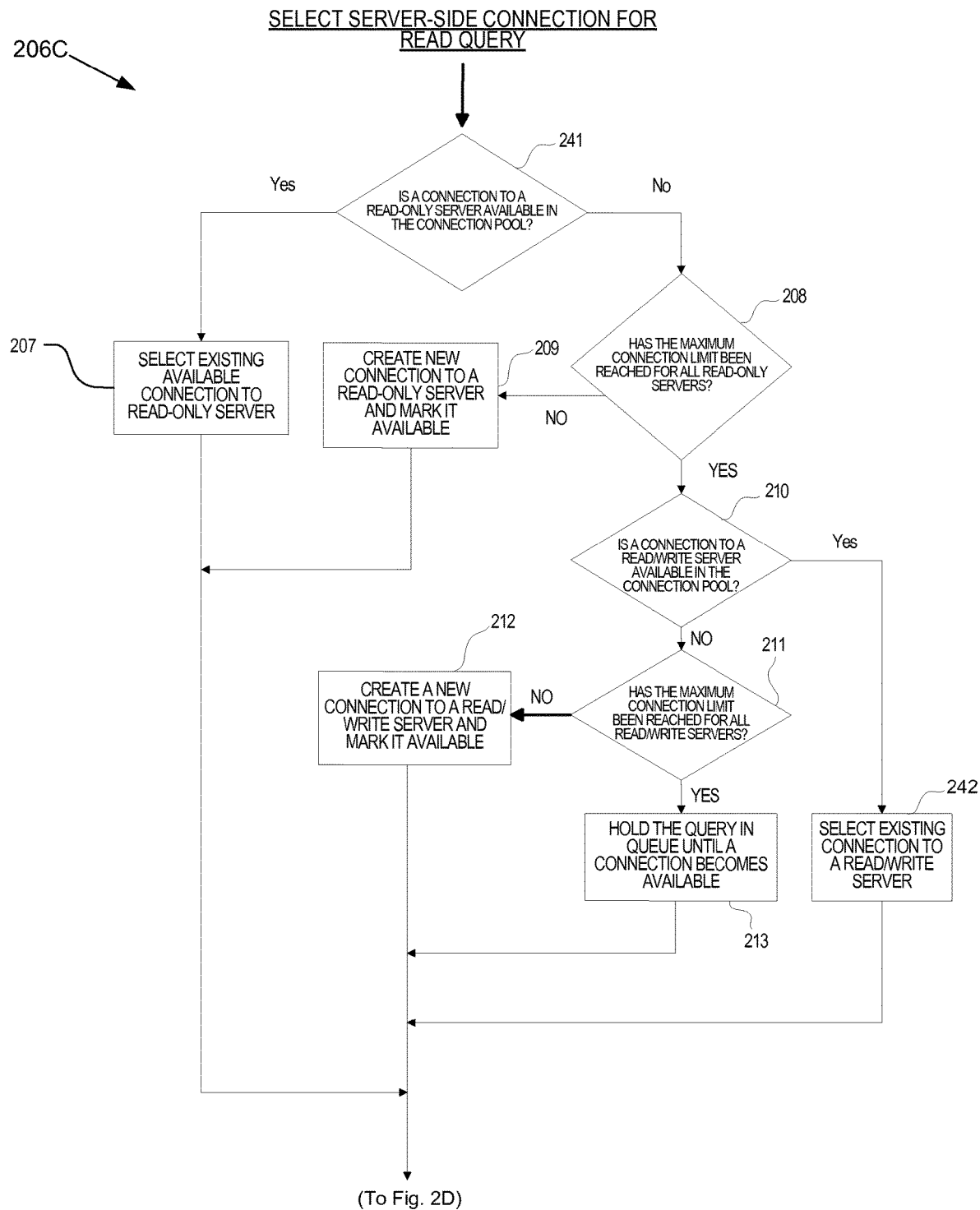
Figure 2D:
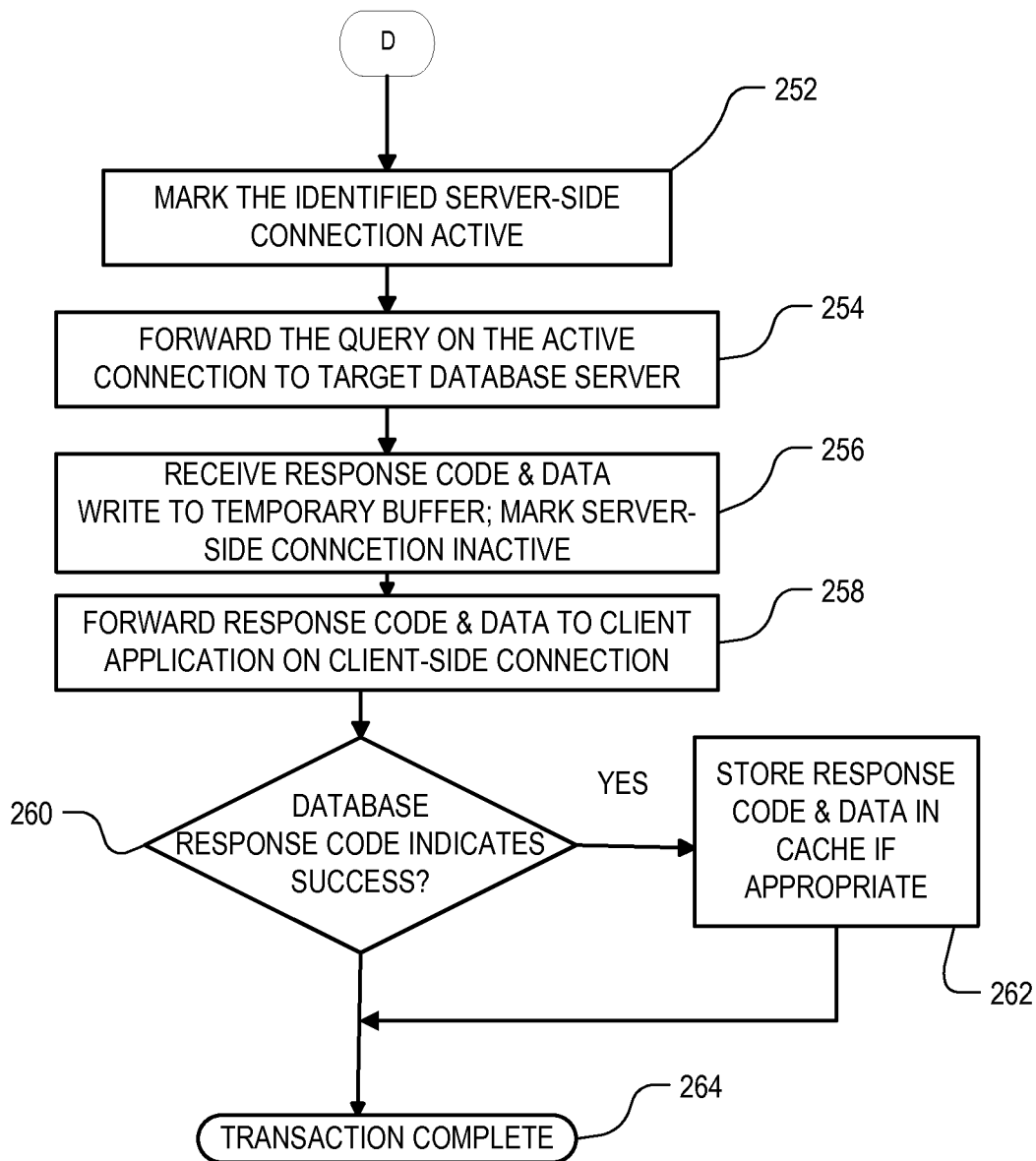

Continuing in FIG. 2D, after a server-side connection is created or selected in step 206B or 206C, the database accelerator 111 marks the identified server-side connection as active (step 252) and forwards the query on the active connection to the selected database server 112 (step 254). The database accelerator sends the query through a network port on the accelerator 111. Physically this port could be the same as the one on which the query was received, though logically it has either a different IP address, different port number or both. As is conventional, the TCP stack in accelerator 111 assigns an otherwise unused port number for this outgoing message so that it can recognize any return transmission as being part of the same conversation.

In step 256, the accelerator 111 receives a response from the database server 112, including the response code and response data. It writes this information into a temporary buffer in the accelerator 111. In step 258, accelerator 111 forwards the response code and data back to the client application on the client-side connection. If the response code indicated that the database query was successful (step 260), then in step 262, database accelerator 111 can store the response code and data in its in-memory cache if appropriate. Either way, the transaction is now complete (step 264). Note that despite being usable in many different database client/server environments, accelerator 111 knows how to find and interpret the response code in the response returned by the database server because the accelerator 111 knows which database environment it is in. Accelerator 111 never caches a response if the response code indicates a failure or error condition.

FIG. 2C is a flowchart detail of step 206C (FIG. 2A), for selecting a server-side connection for a read query. Two separate connection pools are maintained: one for connections to the read-only servers and the other for connections to the read/write servers. These connection pools are user-specific. In step 241 it is determined whether a connection is available in the read-only connection pool. If so, then in step 207 a connection from the pool is selected for use in forwarding the query. If there are more than one connection to a read-only server available, then any desired algorithm can be used to choose among them. For example, a round robin algorithm can be used, or an available connection can be used to a server which currently has the fewest active connections. Yet another algorithm involves keeping track of the query response times achieved by the various database servers, and choosing an available connection directed to the fastest server.

If step 241 determines that no existing connections are currently available for the current user to any of the read-only servers, then in step 208, the database accelerator 111 determines whether the maximum connection limit has been reached for all the read-only servers. If not, then in step 209, a new connection is created to one of the read-only servers and marked as available. This is then the connection that is selected for forwarding the query. Again, if more than one of the read-only servers is below its respective connection limit, then any desired algorithm can be used to choose among them for creating the new connection.

If in step 208 it was determined that the maximum connection limit had been reached for all the read-only servers, then in step 210, the read/write connection pool is checked for available connections. If one or more are available, then one of these connections is selected for handling the read query (step 242). Again, any desired algorithm can be used to select an available connection from this pool when more than one are available.

If step 210 determined that there are no currently available connections in the read/write connection pool either, then in step 211, the database accelerator 111 determines whether the maximum connection limit has been reached for all the read/write servers. If not, then in step 212 a new connection is created to one of the read/write servers for which the limit has not yet been reached, and that connection is used for handling the read query.

If step 211 determined that all read/write servers have also all reached their connection limits, then in step 213, the query is held in a queue until a connection becomes available. A process (not shown) continuously monitors both the queue and the connection pools. Once a connection is available for the current user the query in the queue will be executed using the connection. At that time the query is forwarded to a server 112 using the newly available connection.

Note there are many possible variations in the algorithm for choosing a server 112 for handling a read query once it is determined (step 241) that no connections are currently available in the connection pool for read-only servers. For example, whereas the FIG. 2 flow tries next to create a new connection to a read-only server (steps 208, 209), another embodiment might instead first check for available connections in the connection pool for read/write servers. As another example, whereas in the FIG. 2 flow, if a query is being held in a query queue (step 213), it will be sent on the next connection that becomes available, in another embodiment the query might be held in the queue until a connection to specifically a read-only server becomes available. Many other variations will be apparent.

FIG. 2B is a flowchart detail of step 206B (FIG. 2A), for selecting a server-side connection for a write query. In step 214, the accelerator 111 first determines whether an existing connection is available in the connection pool for read/write servers. If so, then the database accelerator 111 uses that connection to execute the query. Again, if there are more than one connection to a read/write server available, then any desired algorithm can be used to choose among them.

If step 214 determined that no available connections exist in the connection pool for read/write servers, then in step 215 the database accelerator 111 determines whether the maximum connection limit has been reached for all the read/write servers. If not, then in step 216, a new connection is created to one of the read/write servers and marked as available. This is the connection that will be selected for handling the write query. Again, if more than one of the read/write servers is below its respective connection limit, then any desired algorithm can be used to choose among them for creating the new connection.

If in step 215 it was determined that the maximum connection limit had been reached for all the read/write servers, then in step 217, the query is held in a queue until a connection becomes available for the current user. Again, once a connection to a read/write server is available the query in the queue will be executed using the connection. At that time the query is forwarded to a server 112 using the newly available connection.

It will be appreciated that the process flow of FIG. 2 (from step 202 on) is for a single query. In practice many queries will be received from one or more of the clients 110, some of which will be read queries and some of which will be write queries. And of the read queries, some will be satisfied from cache and some will be forwarded to a server 112 for execution. In general, there will be a plurality of queries received from the clients 110 which include at least one that the database accelerator 111 determines is a "read" query and which is not satisfied from cache, and at least one that the database accelerator 111 determines is a "write" query. All of the queries in this plurality which the database accelerator determines is a "write" query are routed to one of the read/write servers 112, and at least one of the queries that the database accelerator 111 determines is a "read" query and which is not satisfied from cache, is routed to one of the read-only servers 112. Additionally, in an embodiment, an additional query that the database accelerator 111 determines is a "read" query and which is not satisfied from cache, can be routed to one of the read/write servers 112.

Figure 19:
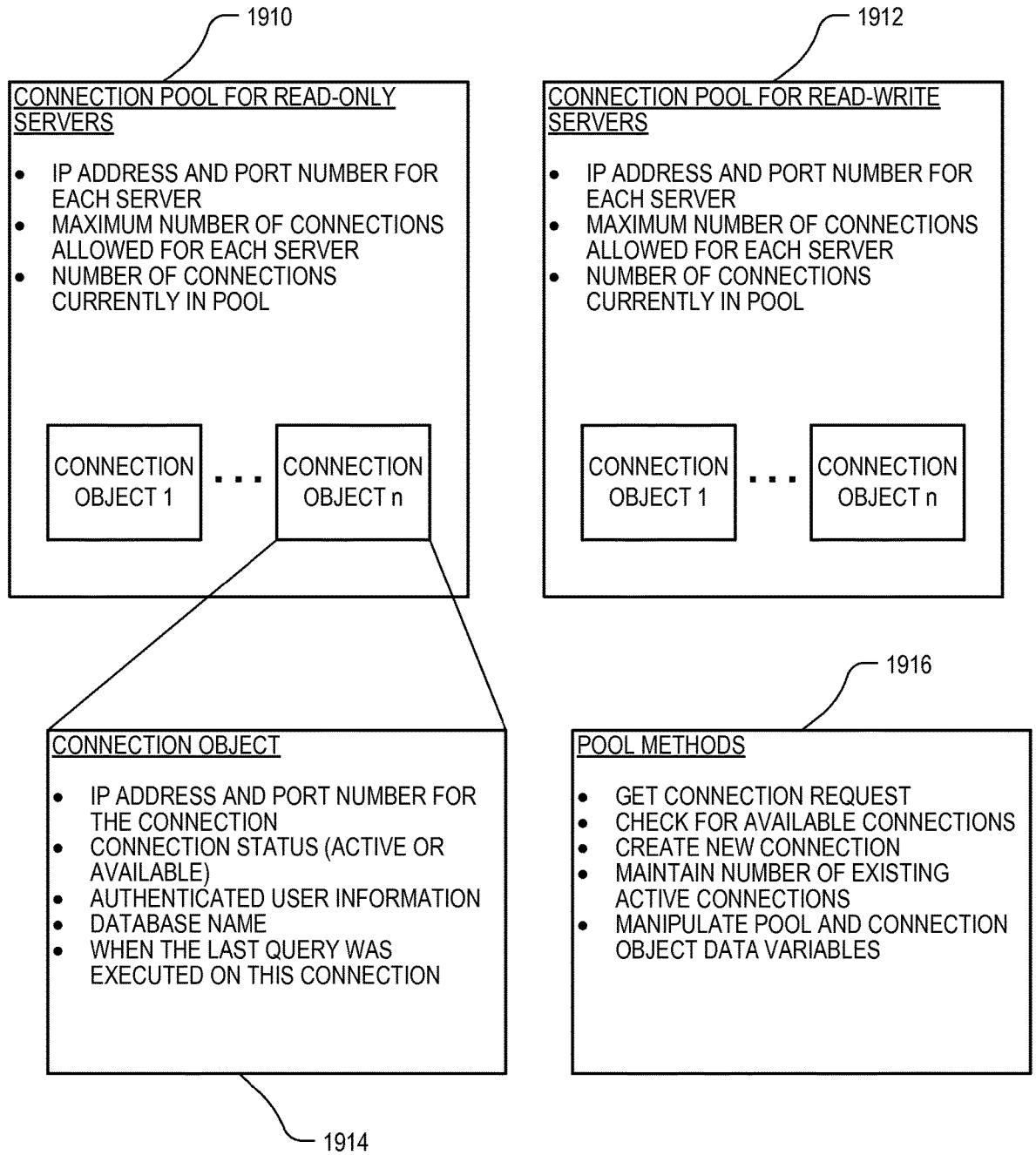
FIG. 19 illustrates connection pools used in FIG. 2.

Several of the steps in FIGS. 2A, 2B and 2C involve reference to, or manipulation of, data maintained by the accelerator 111 in connection pools. Connection pools are maintained separately for each user. FIG. 19 illustrates one user's connection pools, as well as the information they contain and some of the methods associated with them. As can be seen FIG. 19, two separate connection pools are maintained: connection pool 1910 contains only the connections to the read-only servers, whereas connection pool 1912 contains only the connections to the read/write servers. Each connection pool includes the IP address and port number for each server of the respective type, as designated by the user during the configuration process. It also includes indication of the maximum number of connections allowed for each of the servers, as well as an indication of the number of connections currently in the pool. The connection pool also contains a separate connection object for each of the connections in the pool. An example connection object 1914 is shown in FIG. 19, and it can be seen that includes the IP address and port number for the connection (the network address to which queries using the particular connection should be sent); the status of the connection (active or available), authenticated user information for the connection; the name of the database for the connection; and an indication of when the last query was executed on this connection (so that long-unused connections can be torn down). A connection pool also supports a number of methods, as shown in 1916. They include a method to get a connection request; a method to check for an available connection; a method to create a new connection; a method to maintain the number of existing active connections; and methods for manipulating various data variables in the pool object and its connection objects.

It can be seen that all of the determinations made in steps 214, 215, 241, 208, 210 and 211 in FIGS. 2A, 2B and 2C, can be made by reference to the current state of the data variables in the connection pools and connection objects. Similarly, the steps for creating new connections (steps 216, 209 and 212) can be performed using the "create new connection" method of the pools. New connections are created in a given user's pools using credentials provided for the user during configuration of the accelerator 111.

Figure 3:
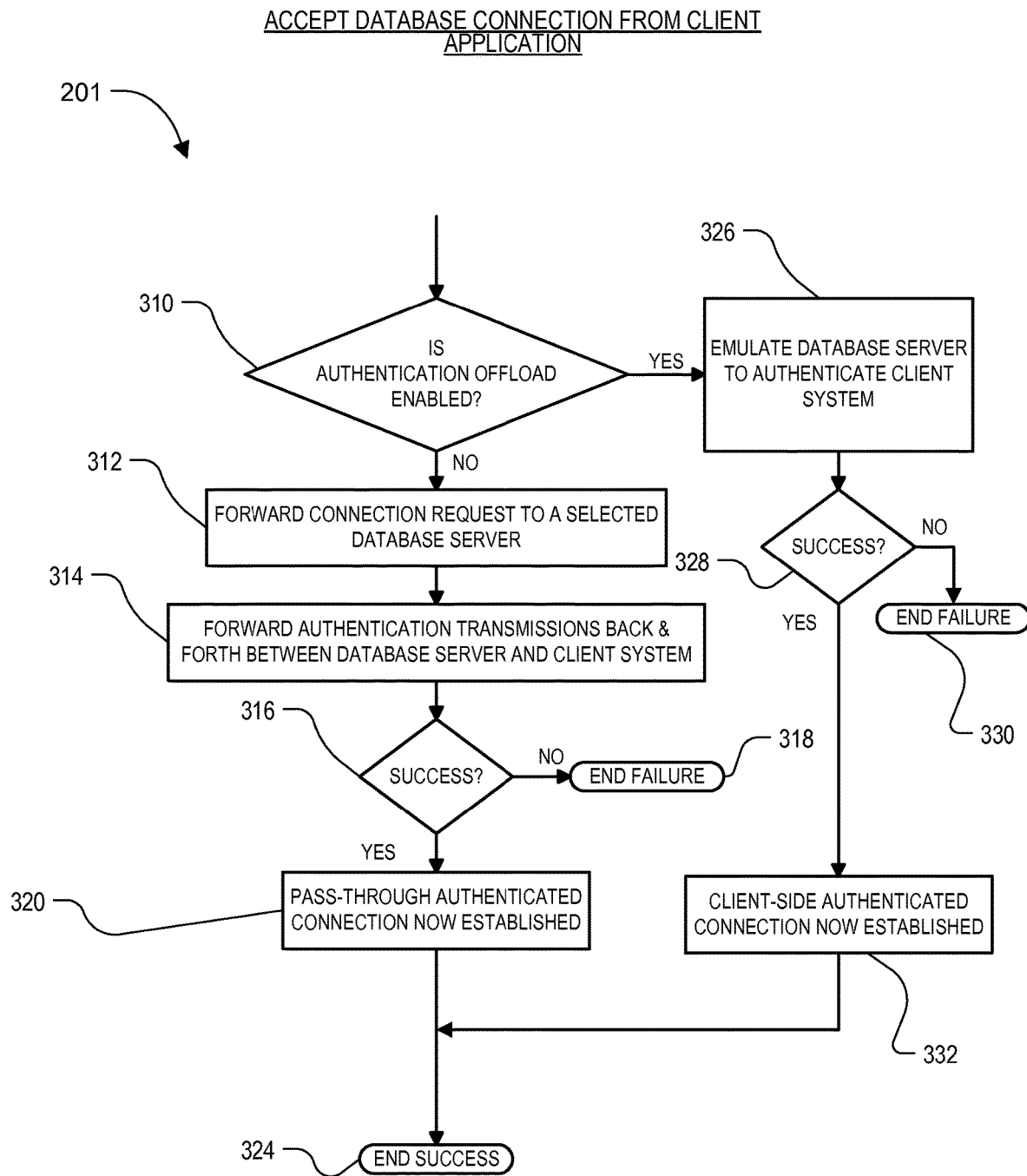
FIG. 3 is a flowchart detail of the step in FIG. 2A for accepting a database connection from a client application.

FIG. 3 is a flowchart detail of step 201 (FIG. 2A), for accepting a database connection from the client application. FIG. 3 in part illustrates the authentication offload feature of the accelerator 111. In particular, the accelerator 111 stores authentication information for individual users, and emulates the authentication process on behalf of the database servers 112. Virtually any authentication protocol implemented in the database client/server environment in which the accelerator 111 is placed, can benefit from the authentication offload feature. An "authentication protocol", as used herein, is a specification for a procedure by which a server can determine the authenticity of a client wanting to access the server. Typically the server implements parts of the protocol, and the client implements other parts of the protocol. For many authentication protocols, multiple "authentication transmissions" are required between a client and server systems. The protocol usually requires a specific sequence of at least two of such authentication transmissions, such as a first authentication transmission from the server to the client, a second from the client to the server, and a third from the server back to the client. A "challenge/response" authentication protocol, as used herein, refers to one in which a "challenge" authentication transmission from the server is based on a challenge code of some kind, not previously known by the client, followed by a response authentication transmission from the client, which is based on both the challenge code and the user's secret credentials. The server system is able to determine from the response authentication transmission, given both the challenge code and the user's secret credentials, whether the response authentication transmission is valid. A challenge/response authentication protocol usually does not require the user's secret credentials to be transmitted as such to the server, thereby helping to maintain the secrecy of the credentials.

In a challenge/response authentication process, the challenge transmission itself can include various segments, such as network addressing fields and other fields not specifically related to the challenge nature of the transmission, as well as "challenge content", which as used herein is a portion of the challenge transmission that depends on the challenge code. The "challenge content" could be the challenge code itself, or other data derived in dependence upon the challenge code. The "challenge content", as used herein, is the minimum portion of the challenge transmission that varies if the challenge code varies. As used herein, the "authentication transmissions" exclude the initial connection request from the client, and the final OK from the server, if there is one.

In one embodiment, the challenge/response authentication protocol is the one used in the MySQL database environment. According to this protocol, when the database server receives a connection request from a client system, it sends a "challenge" transmission back to the client system. The "challenge" transmission includes a random string, sometimes called a "scramble". The client system receives the challenge and calculates a token using an algorithm such as the following:

stage1_hash=SHA1(user-entered password);
token=SHA1(scramble+SHA1(stage1_hash)) XOR stage1_hash, where SHA1 is a hashing algorithm, and '+' is a concatenation operator. The client system sends a "response" transmission to the database server, which includes the token. The server then checks the validity of the response by calculating:

stage1_hash'=token XOR SHA1 (scramble+mysql.user.Password), where mysql.user.Password is SHA1 (SHA1 (user's password)), and was stored previously at the server. The server then compares SHA1 (stage1_hash') with mysql.user.Password, which stores SHA1(SHA1(password)). If they match, then the request is considered authentic and the server sends an "OK" result transmission back to the client system. Only then will database queries from the client system be accepted by the server.

Returning to FIG. 3, in step 310, the accelerator 111 first determines whether authentication offload is enabled. If not, then in step 312, the accelerator 111 forward the connection request to a selected one of the database servers 112. In principle the selected database server 112 can be any of the servers, assuming they all contain the same authentication information for the user. Preferably one of the read/write servers are selected for this purpose, however, at least for the first connection request, in case the user's query is going to be a write query.

In step 314, the accelerator 111 passes authentication transmissions back and forth between the selected database server and the client system, in a pass-through mode. Depending on the database environment, these transmissions can either be very complicated or very simple. They may consist of only one transmission from the server back to the client system, or they may consist of many transmissions in both directions.

In step 316, the accelerator 111 determines whether the authentication process concluded successfully or not. This determination is made in dependence upon the database environment, since different environments indicate authentication success in different ways. In the MySQL environment, for example, success is indicated by an OK result packet transmitted from the database server 112 back toward the client system 110. If an error response packet is received, on the other hand, then in step 318 the authentication process ends in failure.

If authentication was successful in step 316, then in step 318, a pass-through authenticated connection, consisting of both a client-side authenticated connection and a server-side authenticated connection, has now been established. As used herein, the "formation" or "establishment" of an authenticated connection means enabling it for sending or receiving database queries. In the MySQL protocol described above, "formation" or "establishment" of the authenticated connection occurs when the client receives an "OK" result packet from the server after the authentication process.

The authentication process of step 201 then concludes successfully in step 322.

If in step 310 it was determined that the accelerator 111 has authentication offload turned on, then in step 326, the database accelerator 111 emulates a database server by performing the server's role in the authentication sequence with the client system. User authentication information, previously configured into the accelerator 111, is used for this purpose. For example, if the authentication protocol is simply to confirm the accuracy of a clear text password sent from the client system toward the database server with the connection request, the database accelerator 111 simply compares the received password to the one it has stored for the specified username, and transmits an OK result packet back to the client system if they match. This authenticates the connection. As another example, if the authentication protocol is the MySQL protocol as described above, the sequence of authorization transmissions would constitute a challenge transmission issued by the database accelerator 111; a response transmission returned by the client system 110; and an OK result packet that the database accelerator 111 sends back toward the client system 110 to establish the authenticated connection if the response transmission received from the client system matches what the accelerator 111 calculates it should be. This establishes the client-side authenticated connection.

If authentication in step 324 was successful (step 328), then a client-side authenticated connection has been established (step 332) and the step 201 of accepting the database connection from the client application ends successfully (324). If not, then it ends with failure (step 330).

It will be appreciated that this method of client authentication, where authentication offload is enabled, does not itself form any server-side authenticated connection to any database server. That connection is formed only if and when needed (step 209, 212 or 216), or it may already exist.

Figure 6:
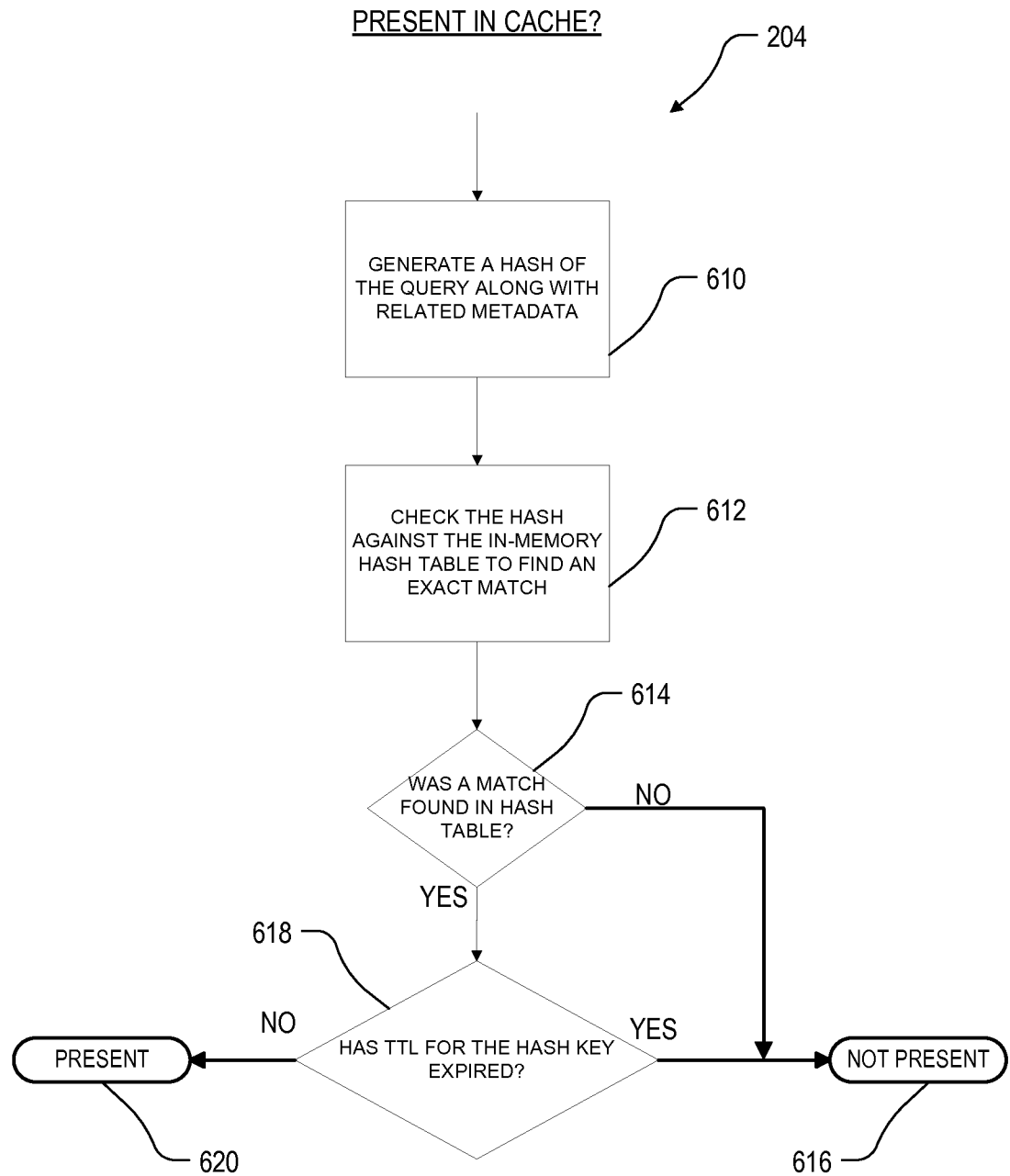
FIG. 6 is a flowchart detail of the step in FIG. 2A for determining whether the data requested by an incoming query is already present in the accelerator cache.

FIG. 6 is a flowchart detail of step 204 in FIG. 2A, for determining whether the data requested by an incoming query is already present in the accelerator 111 cache. In step 610, the accelerator 111 first generates a hash of the query along with related metadata. In one embodiment, the hash can be of the query text alone. Preferably, however, if the accelerator 111 can be used with more than one database, the hash also covers the database name. Still more preferably, the hash also covers the user name of the originator of the query. This permits cached query results to be specific to a particular user. As an example, the hash may be SHA1 (username+database+query), where the '+' operator indicates concatenation.

In step 612, the accelerator 111 checks the hash against the in memory hash table to find an exact match. In an embodiment, hash table functionality is implemented in the accelerator 111 using the Standard Template Library (STL), available from Silicon Graphics, Inc. (SGI). STL is described, for example, in SGI, "Standard Template Library Programmer's Guide" (1999), incorporated by reference herein. The embodiment stores the in-memory cache as a "hash_map" as defined in the STL, using key-value pairs in which the key is the hash, and the value contains at least the following items: a pointer to a buffer in memory containing the response information that was previously received for the query that was the subject of the hash; a time to live (TTL) indication; and a patternId identifying the regular expression pattern which was matched for the query to create cache. It will be seen below that the database accelerator 111 is user-configurable such that not all read queries are cacheable. However, since searching for an exact match in the hash is very quick in the STL, step 612 performs this check for all read queries, without first checking whether the read query is cacheable to begin with. In another embodiment, the accelerator can first check the read query for cacheability before searching the hash table.

In step 614, the accelerator 111 determines whether a match was found in the hash_map. If not, then in step 616, the flow of FIG. 6 ends with a determination that the query data is not present in the cache. If a match was found in step 614, then the accelerator 111 next determines whether the TTL for the hash key has already expired (step 618). If so, then the flow of FIG. 6 ends with a determination that the query data is not present in the cache (step 616). If it has not yet expired, then the flow of FIG. 6 ends with a determination that the query data is present in the cache (step 620).

Figure 7:
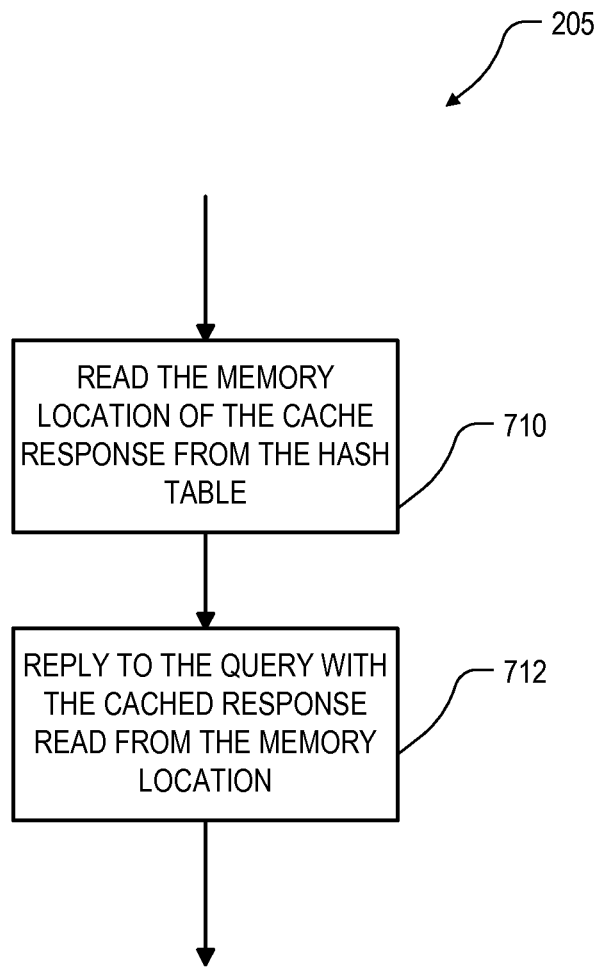
FIG. 7 is a flowchart detail of the step in FIG. 2A, for replying to a query with cached data.

FIG. 7 is a flowchart detail of step 205 in FIG. 2A, for replying to the query with cached data. In step 710, the accelerator 111 reads the memory buffer location indicated in the hash table entry for the current read query, and in step 712, the accelerator 111 replies back to the client system 110 with the cached data from the indicated buffer. There is no need to forward the query to any of the database servers, thereby greatly improving the response time.

Figure 8:
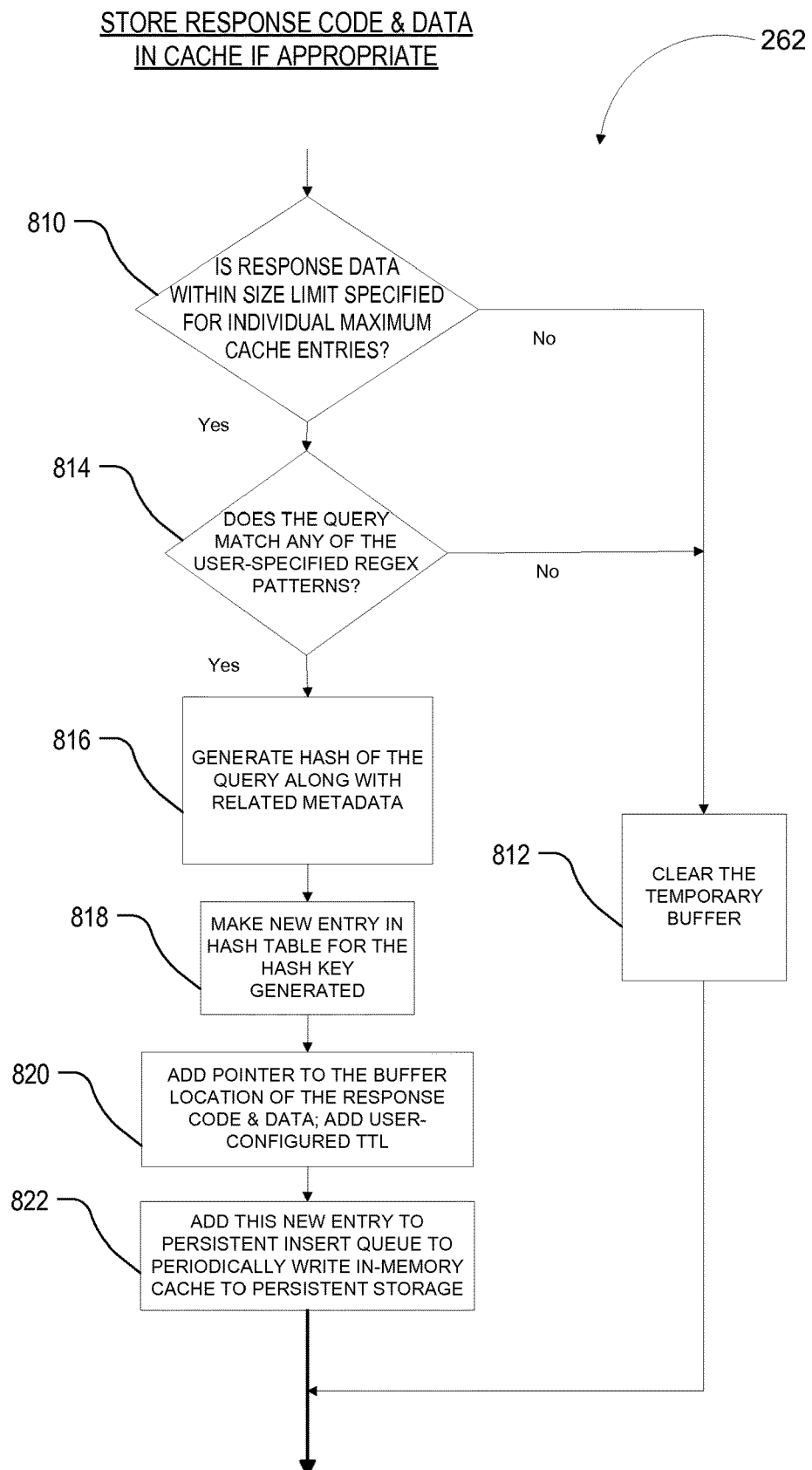
FIG. 8 is a flowchart detail of the step in FIG. 2D for storing a response code and data received from a database server, in the cache, if appropriate.

FIG. 8 is a flowchart detail of step 262 in FIG. 2D, for storing the response code and data received from a database server 112, in the cache, if appropriate. Initially, in step 810, the accelerator 111 determines whether the response data is within a pre-configured size limit for individual cache entries. Very large response data sets are not stored in the accelerator 111 cache. If the response data is too large, then in step 812 the temporary buffer in which the response data had been stored is cleared and made available for a future response data set.

In step 814 it is determined whether the query that resulted in the subject response data, is cacheable in the accelerator 111. In an embodiment, cacheability is configurable by the user, by specifying one or more regular expression patterns. If the query text matches one of the configured patterns, then the query is considered cacheable; otherwise it is not. In an embodiment, patterns are configurable separately for each database accessible through the accelerator 111, and multiple patterns can be configured for each database. Also in embodiment, the user can configure a TTL individually for each pattern. This TTL is copied to the hash_map entry when the query hash and its response data are written to the in-memory cache.

Note that the "matching" of one item to another, as used herein, does not necessarily require identity. For regular expression matching, for example, the rules for interpreting a regular expression define whether a "match" has occurred. Identity matching is considered herein to be only a special case of the term "matching".

If the query is determined to be non-cacheable, then the flow continues with step 812 for clearing the temporary buffer. If the query is determined to be cacheable, then in step 816, the accelerator 111 generates a hash of the query text along with the related metadata. The hash function used in step 816 is the same as the one described above with respect step 610. In step 818, the accelerator 111 makes a new entry in the hash table for the newly calculated hash key. In step 820 the accelerator 111 adds to this entry the TTL previously configured for the matching regular expression pattern, as well as a pointer to the buffer location where the response code and data are stored in the accelerator 111. Steps 818 and 820 can be implemented using functions of the STL described above. In step 822, a new cache entry is also added to a persistent insert queue for eventual writing to persistent storage. The process for backing up the in-memory cache into persistent storage is described elsewhere herein.

The in-memory cache of the accelerator 111 uses a garbage collection process in order to clear out query response data that has expired beyond its TTL. The garbage collection process runs in a separate thread, asynchronously with the main query processing functions. This thread awakens periodically and performs garbage collection either (1) when it will not impact performance of the main functions of the database accelerator 111, or (2) whenever the amount of memory remaining in the cache falls below a predetermined threshold. By forcing garbage collection when the amount of memory remaining in the cache falls below a predetermined threshold, the process of storing response data in the cache (step 262) does not need to concern itself with cache management functions, which could impact performance. For example, step 262 does not need to hold up the caching process in order to find and delete older entries to make space for the new entry.

Figure 9:
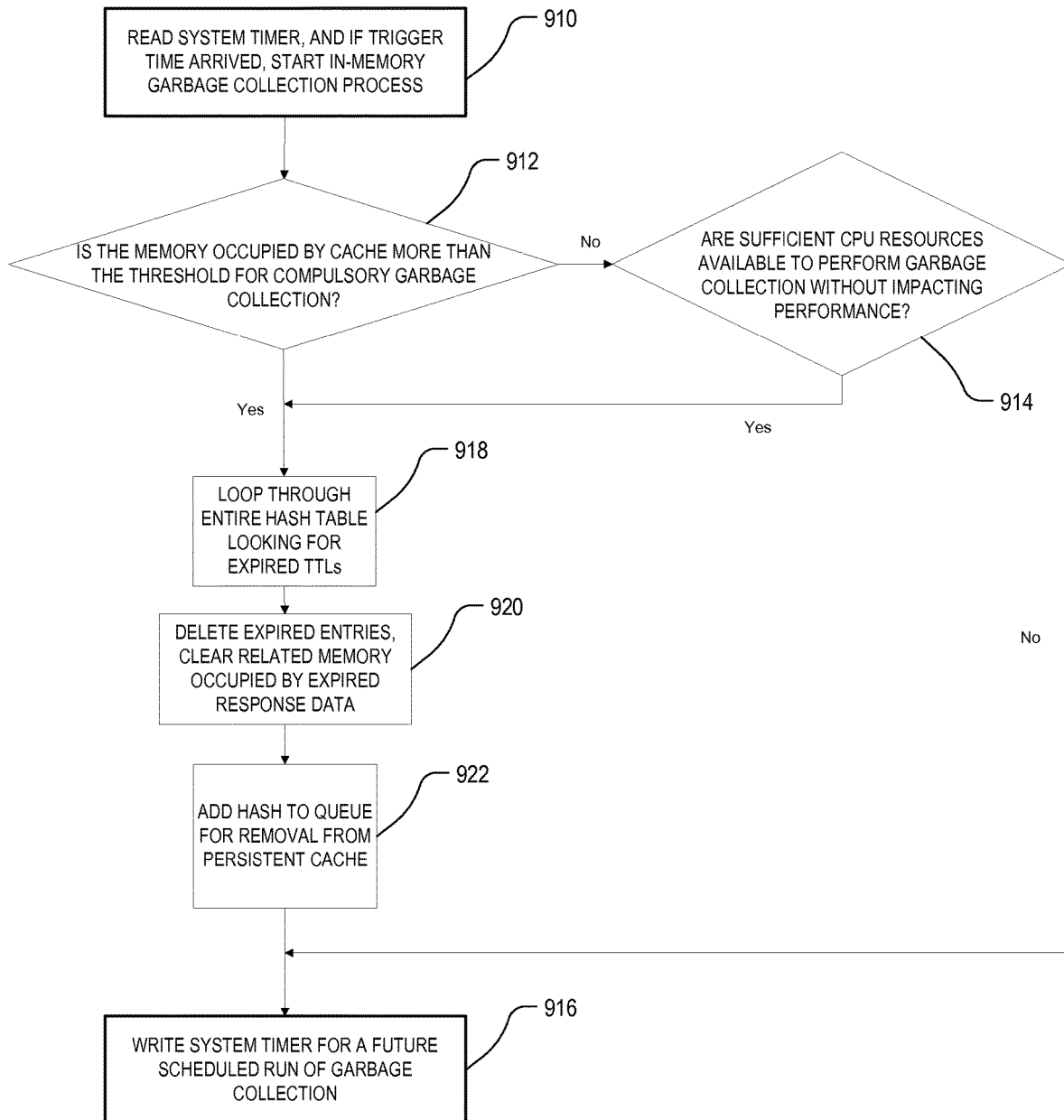
FIG. 9 is a flowchart of a process that can be used by a database accelerator according to the invention for in-memory garbage collection.

FIG. 9 is a flowchart of the process used by database accelerator 111 for in-memory garbage collection. In step 910, the process reads the system timer, and if a trigger time has arrived, it starts the in-memory garbage collection process. In step 512, the database accelerator 111 determines whether the amount of memory currently occupied by the cache exceeds a threshold for compulsory garbage collection. If not, then in step 914, it is next determined whether sufficient CPU resources are available to perform garbage collection without impacting the main functions of the accelerator 111. This can be determined, for example, by checking the average system load reported by the operating system. If the accelerator 111 is currently busy, then the process of FIG. 9 writes the system timer for future scheduled run and goes back to sleep. (Step 916).

If either there are sufficient resources currently available (step 114) or the memory occupied by the cache exceeds the threshold for compulsory garbage collection (step 112), then in step 918, the accelerator 111 begins a loop through the entire hash table for expired TTL's. In step 920, the accelerator 111 deletes all expired entries and de-allocates the related memory occupied by expired response data. In step 922, the hash keys of the entries being deleted are also added to a delete queue for removal also from the persistent backup of the cache. The process of FIG. 9 then proceeds to step 116 for writing the system timer for a future scheduled run and going back to sleep.

Figure 10:
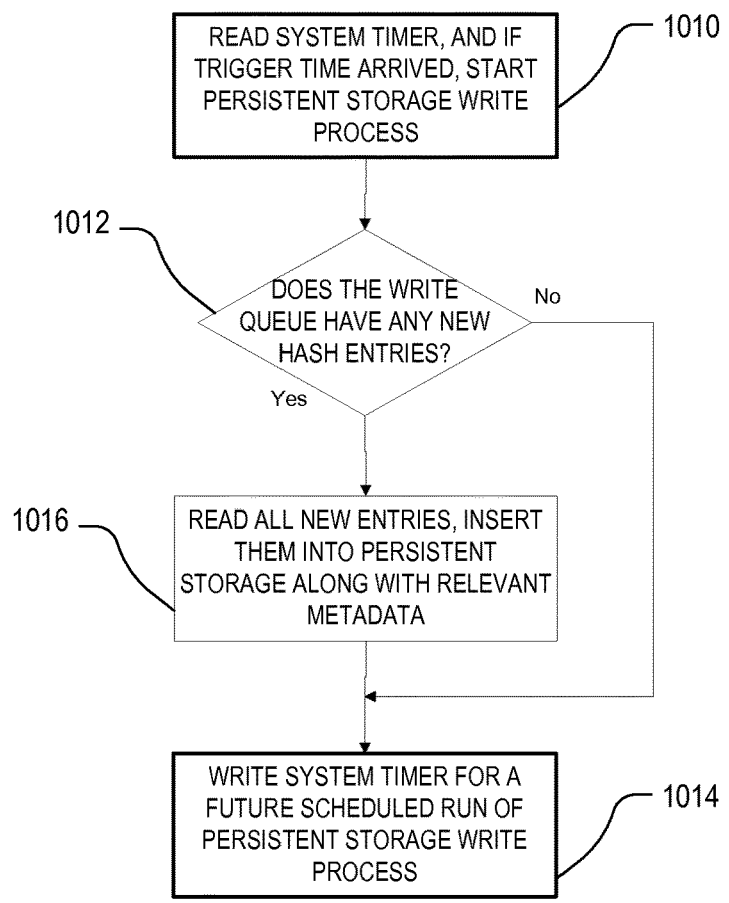
FIG. 10 is a flowchart of a process that can be used by a database accelerator for backing up cached data to persistent storage.

FIG. 10 is a flowchart illustrating the process used in database accelerator 111 for backing up cached data to persistent storage. Persistent storage can be an attached hard disk drive, for example, or a solid-state drive, or any other persistent storage medium accessible to the database accelerator 111. Tiered storage systems are also possible. The backup process of FIG. 10 operates asynchronously, in a separate thread relative to the main functions of the database accelerator 111, thereby helping to minimize any impact that the backup process has on the device's performance in responding to queries.

Referring to FIG. 10, in step 1010, the process reads system timer, and if a trigger time has arrived, it starts the persistent storage process. In step 1012, the process first determines whether the write queue has any new hash entries. If not, then in step 1014, the process writes the system timer for a future scheduled run and goes back to sleep. If in step 1012 there are new entries to write to persistent storage, then in step 1016, the process reads all the new entries and inserts them into persistent storage along with relevant metadata. The data stored in persistent memory for each cache entry includes not only the hash, the TTL and the response data, but also the patterned for which the query was cached. PatternID is a pointer into the table of user configured cacheability regular expression patterns. Maintaining a pointer to the query pattern permits a user to subsequently delete cache entries matching that pattern. Query results also can be deleted from the cache at a granularity of individual entries, by calculating hash key of the query and using it to search the cache for the entry to be deleted.

In an embodiment, the persistent storage of database accelerator 111 is managed by an off-the-shelf software package known as SQLite. SQLite is described in van der Lans, "The SQL Guide to SQLite" (2009), incorporated by reference herein. Information about SQLite can also be found at http://www.sqlite.org/(visited 2010 Jun. 16). The use of a database system such as SQLite to manage the cache entries within the persistent storage medium, permits the entries to be stored in tabular form and easily accessible for inserting, deleting and selecting entries using well-known SQL statements. For example, it permits easy use of SQL statements to select an individual query for deletion.

After all new entries have been inserted into persistent storage, then the process of FIG. 10 continues to step 1014 for writing the system timer for a future scheduled run.

Figure 11:
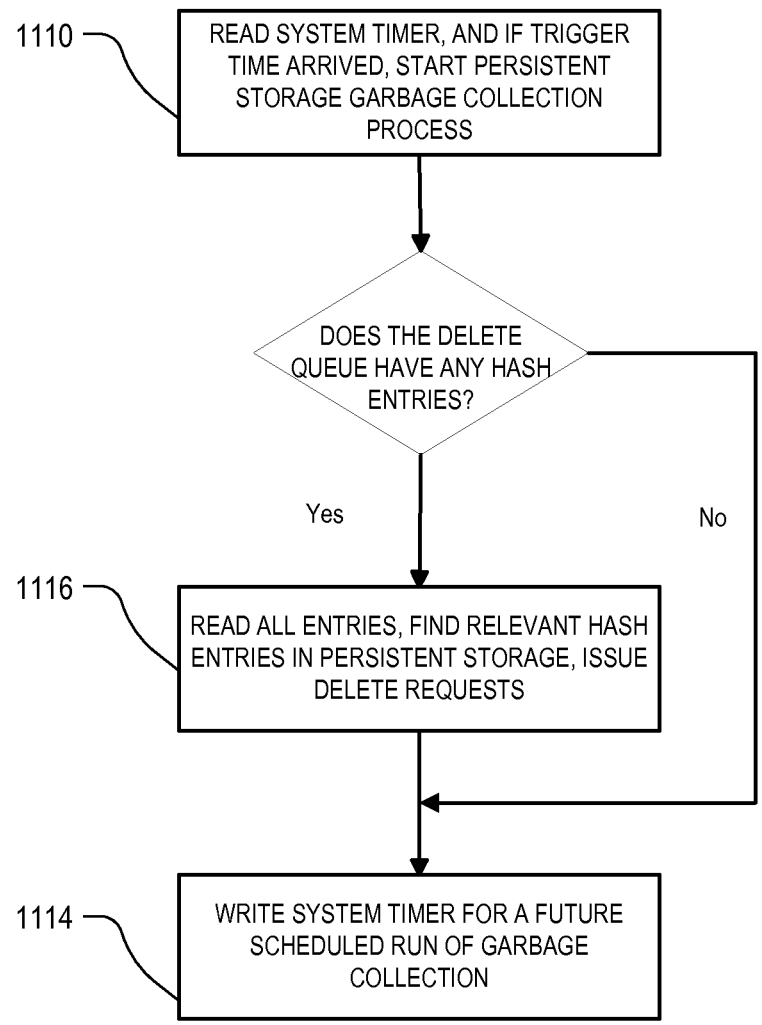
FIG. 11 is a flowchart of a process that can be used by a database accelerator for garbage collection in persistent cache storage.

FIG. 11 is a flowchart illustrating the process used in database accelerator 111 for garbage collection in the persistent cache storage. In step 1110, the process reads the system timer, and if a trigger time has arrived, it starts the persistent garbage collection process. In step 1112, the database accelerator 111 checks the delete queue to determine whether it contains any cache entries that need to be deleted from persistent storage. If not, then in step 1114, the process writes the system timer for a future scheduled run and goes back to sleep. If in step 1112 there are entries to delete from persistent storage, then in step 1116, the database accelerator 111 reads all the entries to be deleted, finds the relevant hash entries in persistent storage, and issues delete requests. Again the use of a database such as SQLite to manage the persistent storage, simplifies step 1116, since simple SQL statements can be used to search by hash key for the entries to deleted, and to delete them. After all entries specified in the delete queue have been deleted, and the process of FIG. 11 continues to step 1114 for writing the system timer for a future scheduled run.

In an embodiment, a user interface is provided on the database accelerator 111 for allowing users to delete selected data from the cache. In an embodiment, these deletions are performed on persistent storage immediately, not as part of the periodically-triggered persistent storage garbage collection process. They are executed first in persistent storage and then in RAM. Thus should the system crash in the middle of a deletion, on reboot persistent storage will lack the entry to be deleted. It therefore will not be reinstated in RAM. If the entry were to be deleted first in RAM, then a condition could occur that an entry which had been deleted from RAM will get re-instated into RAM on re-boot because deletion from persistent storage had never been completed.

Figure 12:
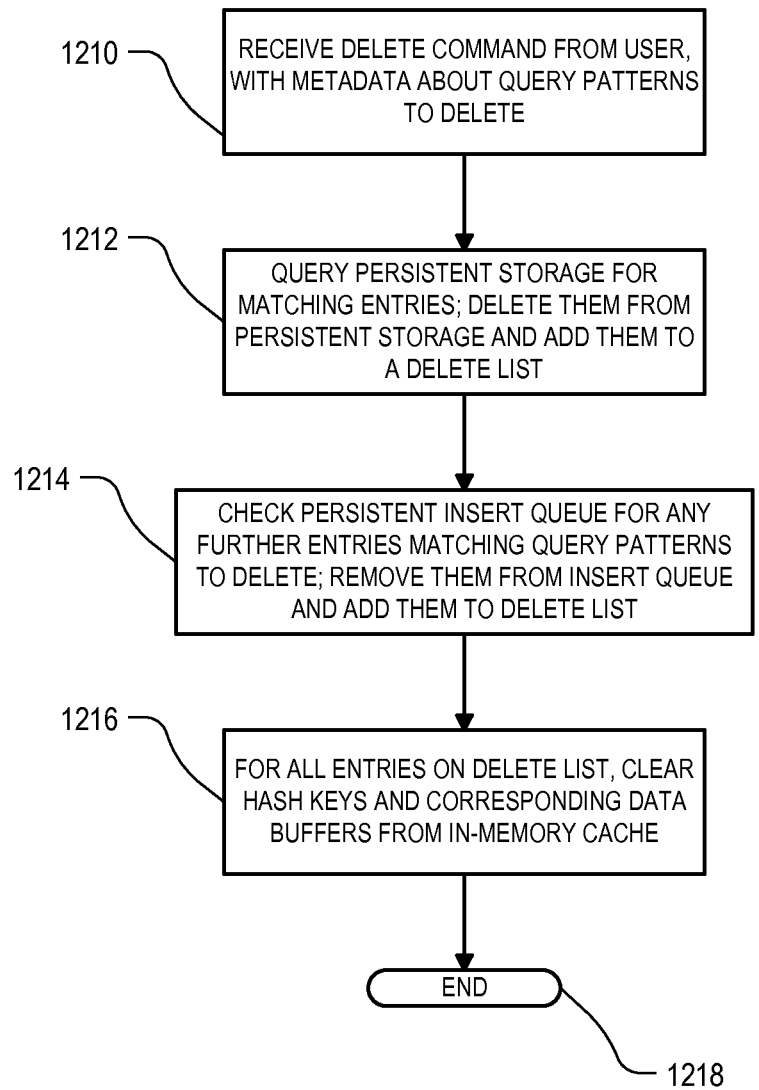
FIG. 12 is a flowchart of a process that can be used by a database accelerator in response to a delete request.

FIG. 12 is a flowchart illustrating the process performed by the accelerator 111 in response to such a delete request. In step 1210, the accelerator receives the delete command from the user. The delete command includes arguments describing the query patterns to be deleted. In an embodiment, the user can specify such query patterns by specifying either one of the regular expressions in the table of user configured cacheability regular expression patterns, or by entering an explicit text query. In step 1212, the accelerator 111 queries persistent storage for matching entries, deletes them from persistent storage, and adds their corresponding hash keys to a delete list. Note that this query is made against persistent storage rather than in memory cache, since persistent cache is organized in relational database tables whereas in-memory cache is organized as hash_map. A search and delete of persistent storage therefore can be performed using SQL statements, and is very efficient. Also, note again that the use of a database such as SQLite to manage persistent storage, simplifies step 1212.

In step 1214, the database accelerator 111 also checks the persistent insert queue for any further entries that match the query patterns to delete. The accelerator 111 adds the hash keys of any entries found, to the delete list and also deletes them from the insert queue. In step 1216, in memory cache is searched for all the hash keys in the delete list, and these entries are deleted from in-memory cache along with their corresponding data. This concludes the process for deleting selected data from the cache via the user interface (step 1218).

One of the advantages of backing up the in memory cache into persistent storage accessible by database accelerator 111, is that the in memory cache can be quickly repopulated if the database accelerator 111 goes down and has to be rebooted. Repopulating the in memory cache from persistent storage, rather than having to rebuild it from new queries issued by the clients 110, avoids a startup bottleneck which could otherwise choke performance for a significant amount of time after system reboot. This bottleneck often occurs in conventional master/server database arrangements as well, without an accelerator such as 111. Providing a query cache with persistent backup could improve the conventional arrangements as well.

Figure 13:
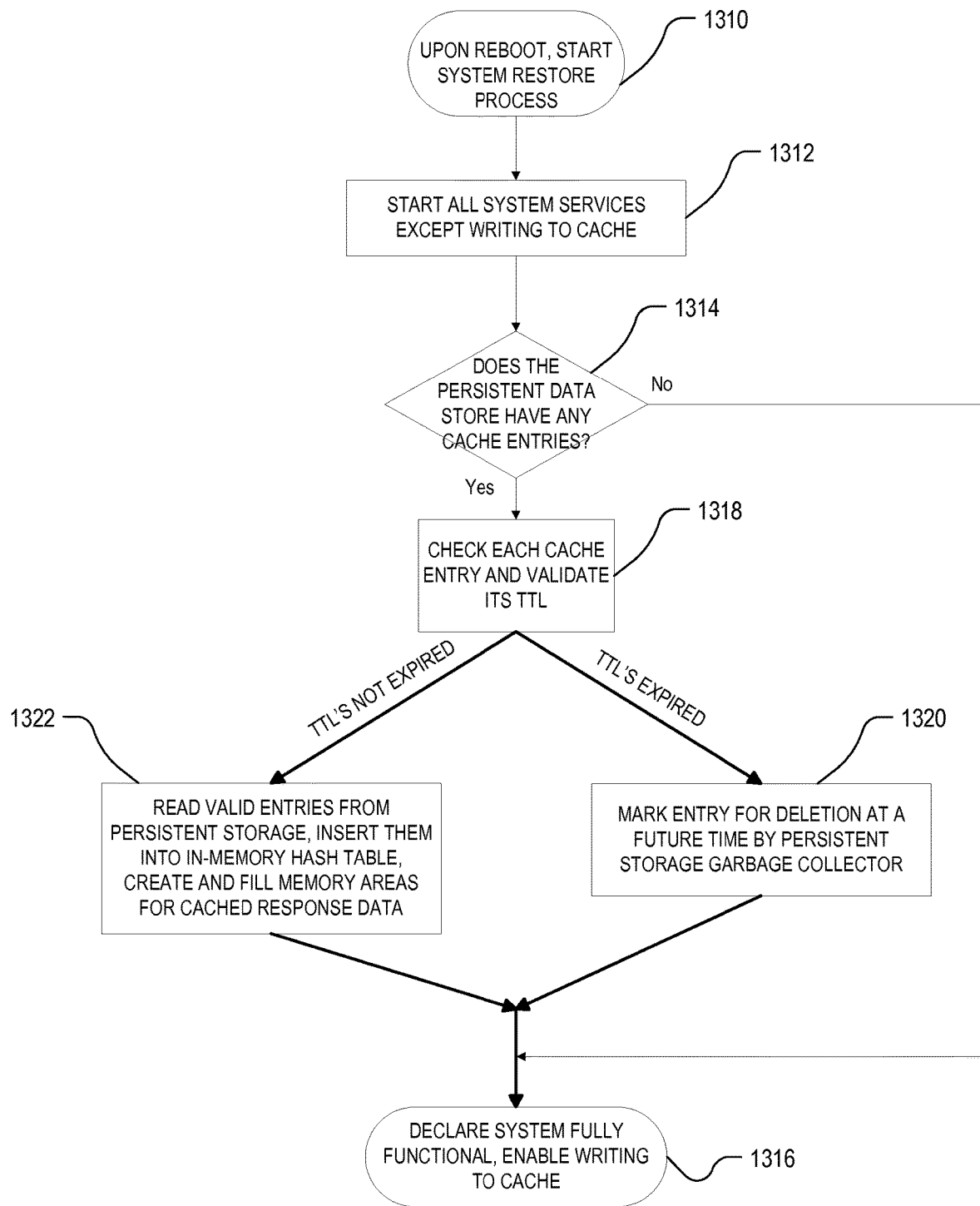
FIG. 13 is a flowchart of a process that can be used by a database accelerator for restoring data from persistent storage to in memory cache on reboot.

FIG. 13 is a flowchart illustrating a process used by the accelerator 111 for restoring data from persistent storage to the in memory cache on reboot. In step 1310, upon reboot, system restore process is started. In step 1312, all system services are started, except the function of writing query results to cache. In step 1314, the accelerator 111 determines whether the persistent data store has any cache entries. If not, then in step 1316, the system is declared fully functional and the writing of cacheable query results to cache is enabled.

If in step 1314 it is determined that persistent data store does have cache entries, then in step 1318, the database accelerator 111 checks each cache entry in persistent storage and validates its TTL. For all entries whose TTL has expired, the entry is marked for deletion at a future time by the persistent storage garbage collector (step 1320). For all entries whose TTL has not yet expired, these entries are read from persistent storage, and inserted into the in-memory hash_map. Data buffers are allocated and filled with the cached response data from persistent storage, and pointers to these buffers are inserted into the hash_map is appropriate (step 1322). After all valid entries from persistent storage have been inserted into the in-memory cache, the flow continues at step 1316 where the system is declared fully functional and the writing of cacheable query results to cache is enabled.

Sample Sequences

FIGS. 14, 15, 16 and 17 illustrate sample sequences that are enabled by features described above with respect to database accelerator 111. These figures are not intended to show conditional branches, since those are illustrated elsewhere herein; these figures merely illustrate sample discrete sequences that can occur under a single set of conditions.

Figure 14:
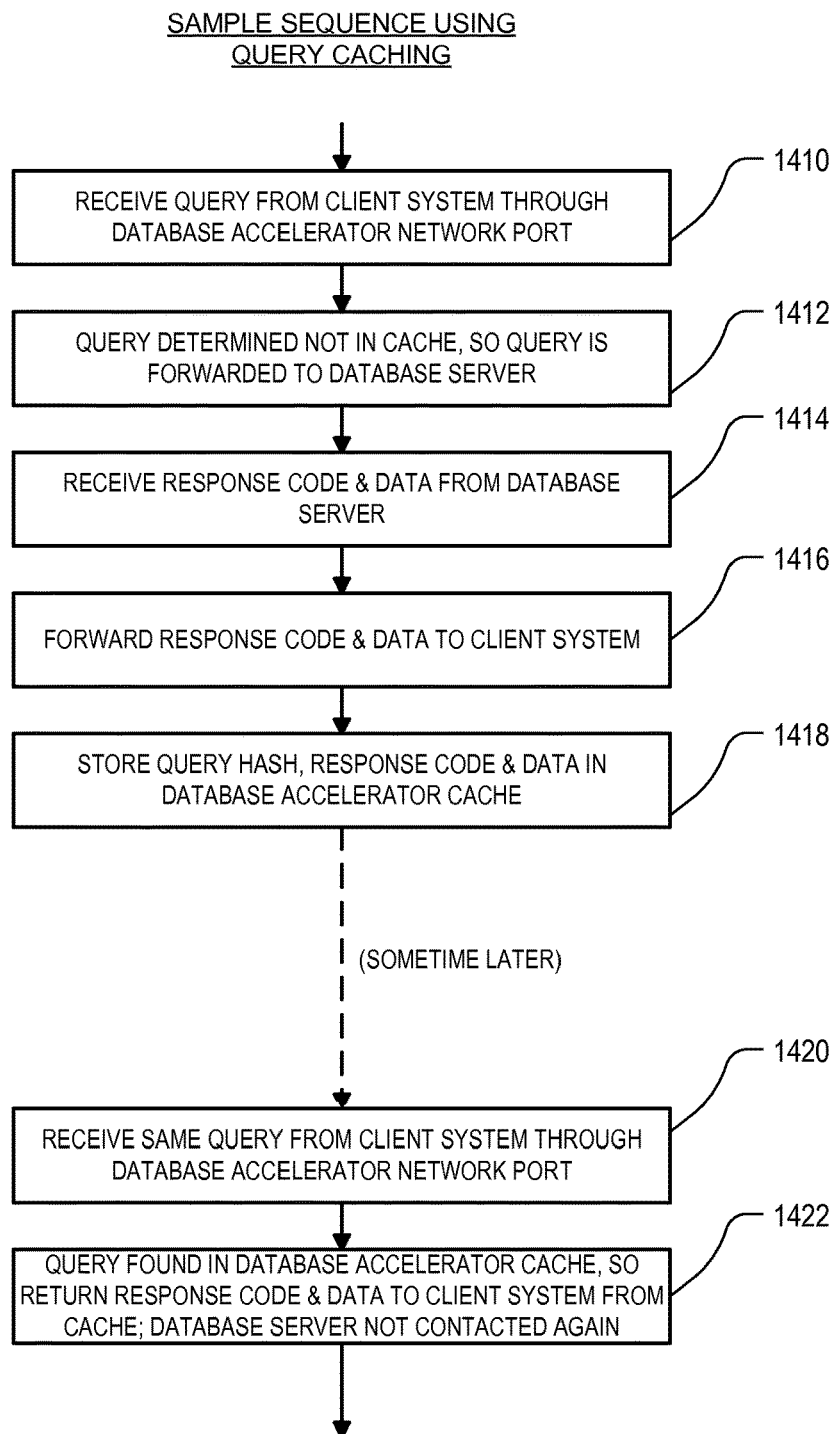
FIGS. 14, 15, 16 and 17 are flowcharts of sample sequences that can be enabled by features of the invention.

FIG. 14 illustrates a sample sequence that can take place on the accelerator 111 using query caching. In step 1410, the accelerator 111 receives a query from a client system 110 through a network port on the database accelerator 111. In step 1412, the accelerator 111 determines that the query is not in cache, so the query is forwarded to one of the database servers 112. In step 1414, the accelerator 111 receives back a response code and response data from the database server 112, and in step 1416, forwards such information back to the client system 110. In step 1418, the accelerator 111 stores the query hash, together with the response code and data and the TTL, in the in-memory cache of the database accelerator 111. As set forth in step 822 (FIG. 8), the new cache entry is also inserted into the persistent insert queue for eventual writing to persistent storage as well. Sometime later, in step 1420, the accelerator 111 receives the same query from a client system 110 through the database accelerator network port. This query need not be from the same client system 110, but as long as the user name is stored as part of the query hash key, this query does need to be from the same user. In step 1422, database accelerator 111 finds the query in the in-memory cache, and returns the response code and data to the client system 110 from the cache itself. The query is not again forwarded to any of the database servers 112, thereby considerably improving the query response time.

Figure 15:
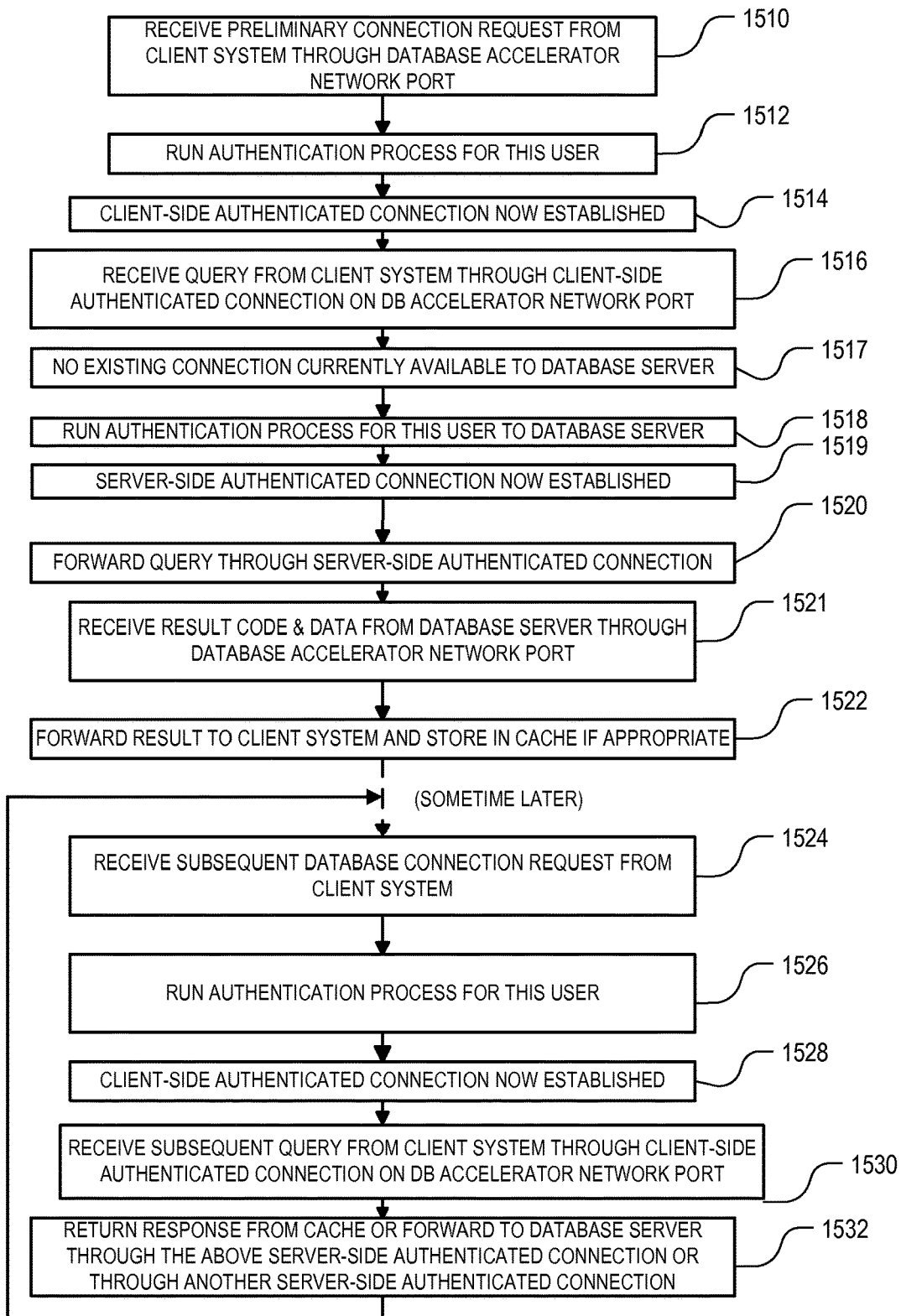

FIG. 15 illustrates a sample sequence that can take place on the accelerator 111 using the authentication offload feature. In step 1510, the accelerator 111 receives a preliminary connection request from one of the client systems 110 through the database accelerator network port. In step 1512 the database accelerator 111 runs the authentication process for this user, for example as described with respect to FIG. 3. In step 1514, the client-side authenticated connection has now been established. In step 1516, the client system now sends a query through the client-side authenticated connection on the database accelerator network port. In step 1517, which assumes the query is not already in cache, the accelerator determines that there is no existing connection currently available to an appropriate database server for this user and query. In step 1518 the accelerator 111 runs the authorization process for this user, emulating a client system, and in step 1519 a server-side authenticated connection has been established. In step 1520 the accelerator 111 forwards the query to the database servers 112 through the new server-side authenticated connection. In step 1521 the accelerator 111 receives back the result code and result data from the database server through a network port of the database accelerator. In step 1522 accelerator 111 forwards the result packet the client system 110 and, if appropriate, also stores the result in cache.

Sometime later, in step 1524, the accelerator 111 receives a subsequent database connection request from one of the client system's 110. Depending on the authentication process used in the database environment, it may be required that this new database connection request be either from the same client system 110, or from the same user name, or both. In step 1526, the database accelerator 111 again emulates a database server 112 by running the authentication process with the client system. In step 1528, a client-side authenticated connection has now been established; note that no new server-side authenticated connection is established at this time. In step 1530, a subsequent query is received from the client system through the new client-side connection and the database accelerator network port, and in step 1532, the accelerator 111 returns a response either from cache or from a database server 112 to which accelerator 111 forwards the new query.

Note that when the accelerator 111 forwards the query to one of the database servers 112, it does so through a server-side connection that was not established in response to the connection request received in step 1524. In some instances it might have been established in response to the received query, for example if the query is not present in cache and no appropriate connections were then available in the connection pools. In most instances, though, the server-side connection through which the accelerator 111 forwards the query had already existed and had already been authenticated since prior to receiving this new connection request.

After a response is returned to the client system 110 in step 1532, steps 1524 through 1532 can be repeated any number of times.

Figure 16:
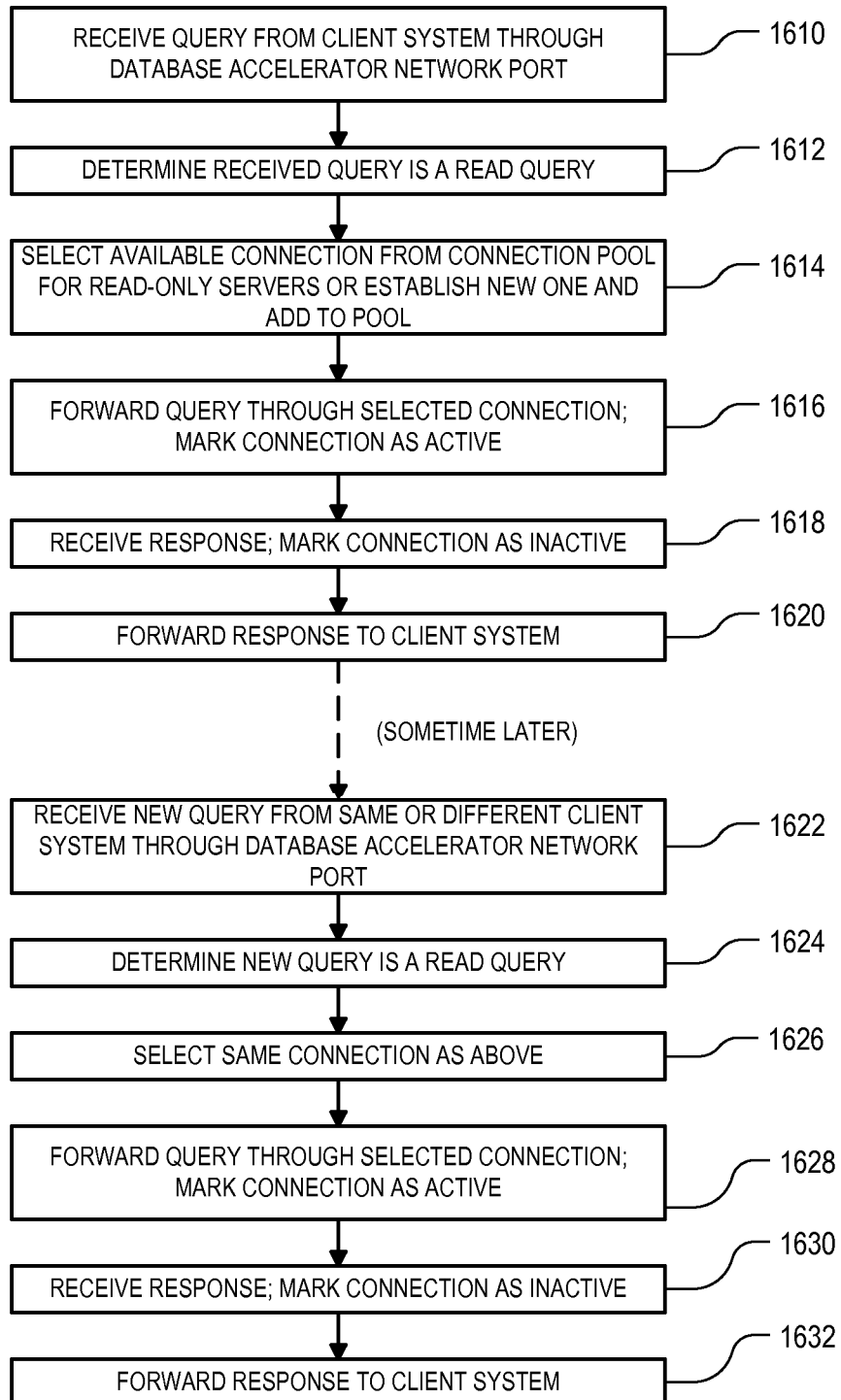
Figure 17:
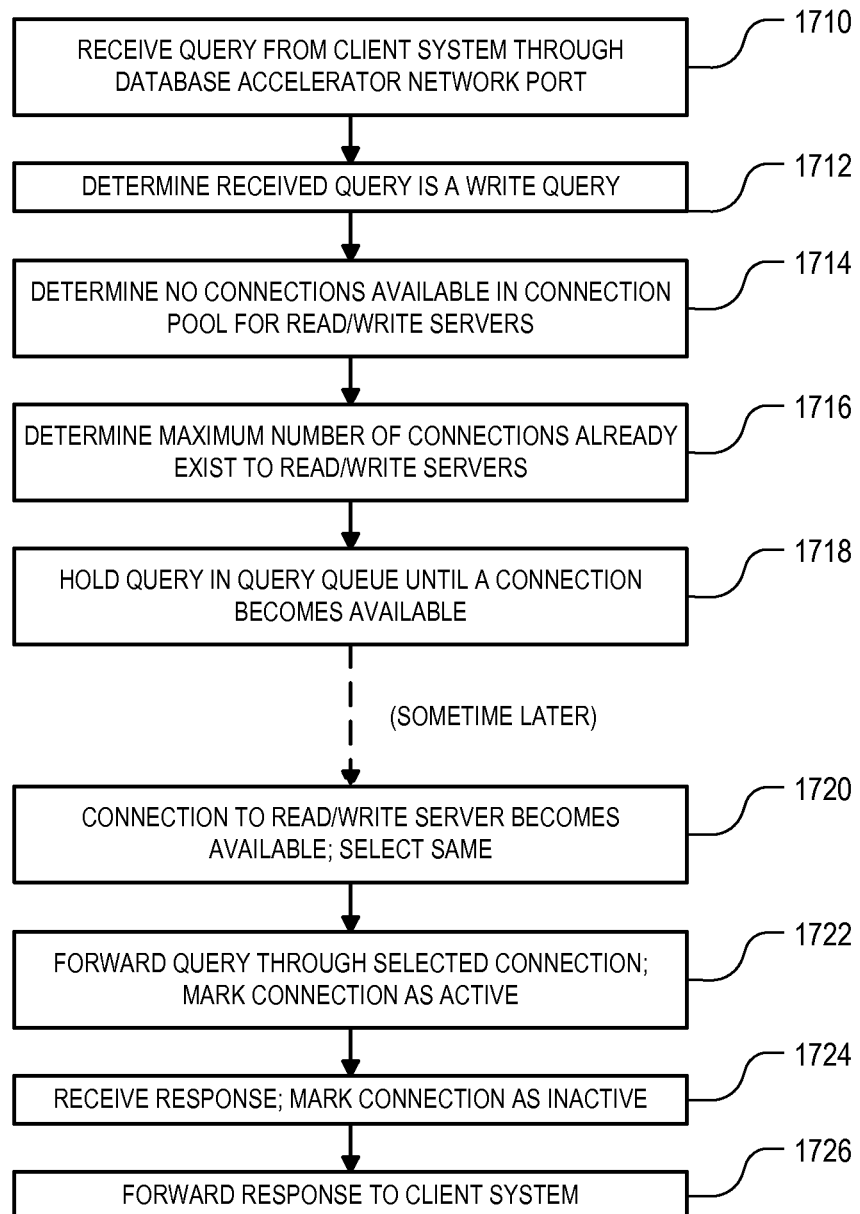

FIGS. 16 and 17 illustrates to sample sequences that can take place on the accelerator 111 using the server-side connection pooling feature. Numerous permutations of sequences can take place based on the flow charts of FIGS. 2A, 2B, 2C and 2D, and those not set forth explicitly in FIGS. 16 and 17 will be apparent to the reader. Applicant hereby affirmatively discloses all such permutations.

The sample sequence of FIG. 16 illustrates the use of a single server-side connection in the connection pool for more than one query which may come from different client systems. In step 1610, the database accelerator 111 receives a first query from a first one of the client systems 110 on the database accelerator network port. In step 1612, as an example, the database accelerator determines that the received query is a read query (step 203 of FIG. 2A). In step 1614, the accelerator 111 either selects an available connection from the connection pool 1910 for read-only servers (step 207 in FIG. 2C), or establishes a new one (step 209 in FIG. 2C). In step 1616 the accelerator 111 forwards the query through the selected connection, and marks it as active (steps 252 and 254 of FIG. 2D). In step 1618 the accelerator 111 receives a response and marks the selected connection inactive (step 256). Note that the accelerator 111 does not at this time terminate or tear down the selected connection even though the query and response transaction has been completed. Instead the connection remains in the connection pool for subsequent reuse.

Sometime later, in step 1622, the accelerator 111 receives a new query from one of the client systems 110 through the database accelerator network port. This new query could come from the same client system 110 or from a different client system 110 as the query received in step 1610. In step 1624 database accelerator 111 determines that the new query also is a read query, and in step 1626 it happens that the accelerator 111 selects the same server-side connection as it had selected in step 1614, from the connection pool for read-only servers. In step 1628 the database accelerator 111 forwards the new query through the selected connection, and in conjunction therewith, marks the connection as active. In step 1630 the accelerator 111 receives a response, and marks the connection as inactive. In step 1632 it forwards the response back to the client system that issued the original query received in step 1622.

The sample sequence of FIG. 17 illustrates the use of the query queue for holding queries when it is found that all existing connections are currently unavailable and the maximum number of connections has already been created. In step 1710, the accelerator 111 receives a query from one of the client systems 110 through the database accelerator network port. In step 1712, this time the accelerator determines that the received query is a write query (step 203 in FIG. 2A). In step 1714 the accelerator 111 next determines that no connections are available in the connection pool for read/write servers (step 214 in FIG. 2B), and in step 1716 the accelerator 111 determines further that the maximum number of connections already exist to the read/write servers (step 215 in FIG. 2B). Accordingly, in step 1718 the accelerator 111 holds the query in a query queue until a connection becomes available (step 217 in FIG. 2B).

Sometime later, in step 1720, a connection to one of the read/write servers becomes available in the connection pool 1912, and the accelerator 111 selects this connection for forwarding the subject query. In step 1722 the accelerator forwards the query through the selected connection and marks the connection as active (steps 252 and 254 in FIG. 2D). In step 1724 the accelerator 111 receives a response, and marks the connection as inactive (step 256 in FIG. 2D). Again, accelerator 111 does not terminate or tear down the selected connection at this time, leaving it available for subsequent reuse. In step 1726 the accelerator 111 forwards the response back to the client system 110 that issued the query (step 258 in FIG. 2D).

Software Modules

Figure 18:
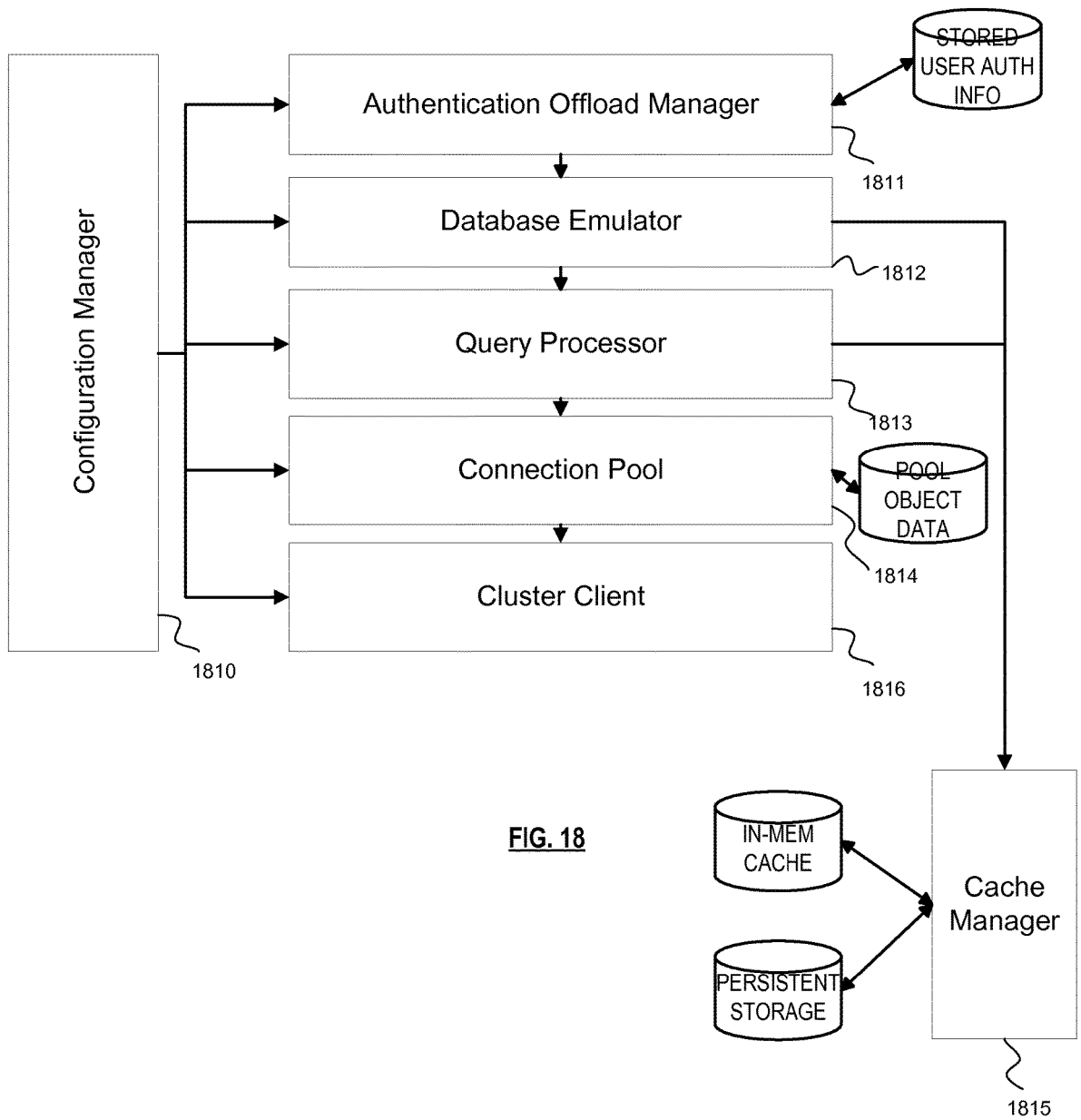
FIG. 18 is a block diagram illustrating software modules which can be used to implement features of the invention.

FIG. 18 is a block diagram illustrating software modules which can be used to implement the functions illustrated in the flow charts herein. The modules illustrated in FIG. 18 perform the following functions, among other things:

Configuration Manager 1810 allows administrators manage the configuration and network settings of the clusters, to add or remove servers into the cluster's configuration, and specify the functions they perform, and their capacity (read only, read-write, maximum number of connections). Also allows configuration of other parameters like the users, authentication offload, query firewall, and cache management.

Authentication Offload Manager 1811 contains the user authentication information for the database, which it uses to accept and authenticate connections to the database emulator, and further, to connect to the actual database servers themselves via the Database client.

Database Emulator 1812 allows the database accelerator to emulate the connection behavior of a database server, making the client application connecting to the accelerator 111 believe that it is connecting transparently to a database server itself, rather than some other intermediate device.

Query Processor 1813 accepts the queries which the clients provide the Database Emulator, and makes decisions on what is to be done with these queries based on the rules defined by the administrator via the configuration manager. If it identifies the query as a read or select query, then it checks the cache to see if that query's resultant data is already available, and if it is available, returns the result back to the database emulator to be passed to the client. If it finds that the result is not in cache, then it sends the query to be processed to the appropriate server with read query ability via the connection pool. If it identifies the query as a write query, it sends the query to an appropriate server with write query ability via the connection pool.

Connection Pool 1814 maintains the list of any server connections created by the database client to the various database servers in the cluster. It allows to sort this list by number of connections to a particular server, type of connections (read-only or read/write), as well as utilized or unutilized connections. It also maintains a FIFO query queue when the maximum number of connections to the servers have been reached, and more queries are waiting to be processed. When a connection becomes available, the connection pool checks the queue, and sends any waiting queries to the appropriate servers via the cluster client.

Cache Manager 1815 maintains a list of all rules for cacheability of read queries, and when such a query is executed on the database, stores it in a cache store comprised of an in-memory (RAM) hash map, and a persistent data store which is used to restore the cache in event of a power failure or crash. The in-memory map helps speed up the cache response, and the persistent data stores improves the reliability of the caching system. As used herein, a cache is a storage area that keeps frequently-accessed data readily available so that the system does not have to retrieve them repeatedly from slower devices, in this case a database server. As used herein, all caches have the characteristic that the data is held therein for re-use, but can be deleted at any time to make room for other data. Thus there is no guarantee that desired data will be present in the cache when needed, though if it is, then response time will be improved.

Cluster Client 1816 maintains client connections to the database servers which are part of the cluster, using authentication information provided by the authentication offload manager. This module is utilized to execute queries on the database servers, and return the data back to the query processor, and in turn, back to the original client which requested the query to be processed. It also transmits keep-alive messages as appropriate to the database servers in order to prevent the servers from timing out the connections prematurely.

Figure 20:
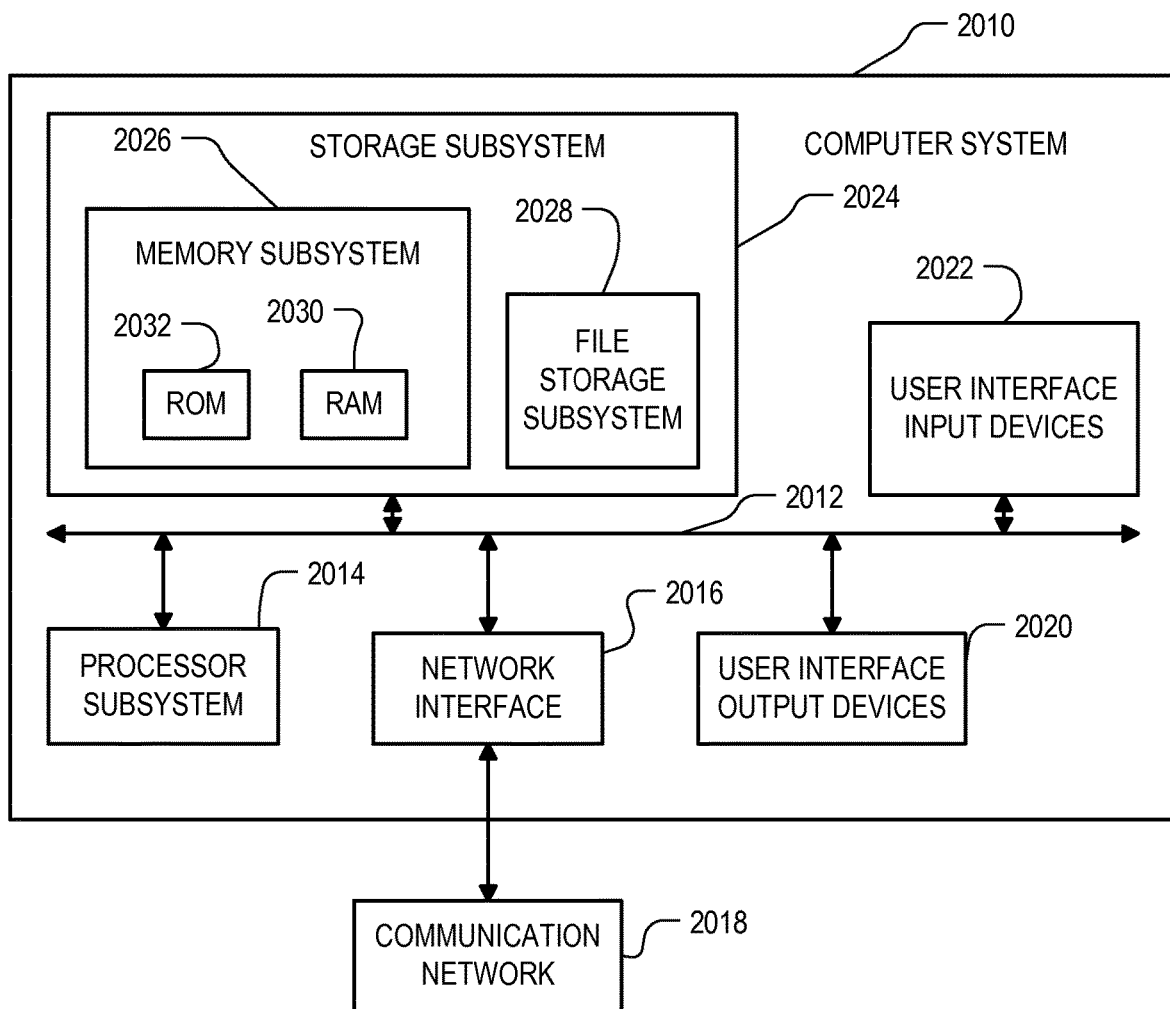
FIG. 20 is a simplified block diagram of a computer system that can be used to implement features of the invention.

FIG. 20 is a simplified block diagram of a computer system 2010 that can be used to implement the database accelerator 111 incorporating aspects of the present invention. While FIG. 18 indicates individual components as carrying out specified operations, it will be appreciated that each component actually causes the computer system 2010 to operate in the specified manner. In one embodiment the accelerator 111 is a separate appliance, in which case FIG. 20 represents the hardware on which it runs. In another embodiment the accelerator 111 runs on a virtual machine housed together on the same computer system as other virtual machines, in which case FIG. 20 represents software-emulated hardware. It also represents the physical hardware of the machine on which all the virtual machines are running.

Computer system 2010 typically includes a processor subsystem 2014 which communicates with a number of peripheral devices via bus subsystem 2012. These peripheral devices may include a storage subsystem 2024, comprising a memory subsystem 2026 and a file storage subsystem 2028, user interface input devices 2022, user interface output devices 2020, and a network interface subsystem 2016. The input and output devices allow user interaction with computer system 2010. Network interface subsystem 2016 provides an interface to outside networks, including an interface to communication network 2018, and is coupled via communication network 2018 to corresponding interface devices in other computer systems. In an embodiment in which the accelerator 111 is a separate appliance, network interface 2016 provides the physical network port that the accelerator 111 uses to communicate with the client systems 110 and the database servers 112. As mentioned, accelerator 111 may include more than one network interface device 2016 to support more than one physical network port.

Communication network 2018 may comprise many interconnected routers, computer systems and communication links. These communication links may be wireline links, optical links, wireless links, or any other mechanisms for communication of information. While in one embodiment, communication network 2018 is the Internet, in other embodiments, communication network 2018 may be any suitable computer network. In particular, it may be or include one or more virtual networks as shown in FIG. 4.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 2022 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 2010 or onto computer network 2018.

User interface output devices 2020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 2010 to the user or to another machine or computer system.

In an embodiment, the accelerator 111 can be configured using a web-based interface, so that user interface input and output devices may be unnecessary in normal operation.

Storage subsystem 2024 stores the in-memory cache and the persistent cache backup. Either or both of these can be multi-tiered. Storage subsystem 2024 also stores the basic programming and data constructs that provide the functionality of certain embodiments of the present invention. For example, the various modules implementing the functionality of certain embodiments of the invention may be stored in storage subsystem 2024. These software modules are generally executed by processor subsystem 2014.

Memory subsystem 2026 typically includes a number of memories including a main random access memory (RAM) 2030 for storage of instructions and data during program execution and a read only memory (ROM) 2032 in which fixed instructions are stored. Main memory 2030 also typically stores the in-memory cache in the accelerator 111. File storage subsystem 2028 provides persistent storage for program and data files, including the persistent cache backup, and may include a hard disk drive, a floppy disk drive along with associated removable media, a CD ROM drive, an optical drive, a solid state drive, or removable media cartridges. The databases and modules implementing the functionality of certain embodiments of the invention may have been provided on a computer readable medium such as one or more CD-ROMs, and may be stored by file storage subsystem 2028. The host memory 2026 contains, among other things, computer instructions which, when executed by the processor subsystem 2014, cause the computer system to operate or perform functions as described herein. As used herein, processes and software that are said to run in or on "the host" or "the computer", execute on the processor subsystem 2014 in response to computer instructions and data in the host memory subsystem 2026 including any other local or remote storage for such instructions and data.

Bus subsystem 2012 provides a mechanism for letting the various components and subsystems of computer system 2010 communicate with each other as intended. Although bus subsystem 2012 is shown schematically as a single bus, alternative embodiments of the bus subsystem may use multiple busses.

Computer system 2010 itself can be of varying types including a personal computer, a portable computer, a workstation, a computer terminal, a network computer, a television, a mainframe, a standalone appliance, or any other data processing system or user device. Due to the ever-changing nature of computers and networks, the description of computer system 2010 depicted in FIG. 20 is intended only as a specific example for purposes of illustrating the preferred embodiments of the present invention. Many other configurations of computer system 2010 are possible having more or less components than the computer system depicted in FIG. 20.

As used herein, a given event is "responsive" to a predecessor event if the predecessor event influenced the given event. If there is an intervening processing element, step or time period, the given event can still be "responsive" to the predecessor event. If the intervening processing element or step takes input from more than one predecessor event, the output of the processing element or step is considered "responsive" to each of the event inputs. If the given event is the same as the predecessor event, this is merely a degenerate case in which the given event is still considered to be "responsive" to the predecessor event. "Dependency" of a given event upon another event is defined similarly.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. An apparatus comprising:
    means for receiving, from a client system, a first database query and directed to a particular IP address and port combination of one or more database servers, wherein the database server includes a cache memory;
    means for determining, in dependence upon content of the first database query and database authentication credentials of a user of the client system making the database query, whether the first database query is one for which valid response data is already stored in the cache memory, wherein the authentication credentials include a user identifier, and the user identifier is distinct from the query;
    means for returning the response data when the cache memory includes the valid response data;
    means for forwarding the first database query through a network to one or more of the database servers if the cache memory does not include the valid response data; and
    means for receiving, through a second network port, response data from the second database server to the first database query when the first database query has been forwarded to a second database server;
    means for forwarding the response data to the client system when the first database query has been forwarded to a second database server;
    means for comparing the first database query, which is distinct from the user identifier, against criteria for cacheability when the first database query has been forwarded to a second database server; and
    means for caching, in dependence on the comparison, the response data in the cache memory in association with an indication of the first database query when the first database query has been forwarded to a second database server.

2. The apparatus of claim 1 further comprising:
    means for receiving a second response data from one of the database servers to a second database query made by a second one of the client systems; and
    means for forwarding the second response data through a network port toward the second client system without caching the second response data.

3. The apparatus of claim 1 further comprising:
    means for receiving a second database query made by the set of client systems and directed to the particular IP address and port combination;
    means for determining that the second database query matches the first database query;
    means for returning response data from the cache memory in response to the step of determining.

4. The apparatus of claim 1 further comprising:
    means for maintaining the cache memory contents in RAM; and
    means for maintaining a backup of the cache memory contents in persistent storage.

5. The apparatus of claim 4, further comprising:
    means for re-populating at least part of the cache memory RAM in dependence upon the contents then in persistent storage in response to a re-boot.

6. The apparatus of claim 1, wherein the means for caching the response data in a cache memory includes means for storing the response data in a cache memory in further association with an indication of a user-programmed time-to-live applicable to that response data.

7. The apparatus of claim 6, wherein;
the criteria for cacheability include a plurality of cacheability rules, and
each of the cacheability rules has associated therewith an indication of a time-to-live to be associated with response data cached in accordance with the respective cacheability rule.

\* \* \* \* \*